(12) United States Patent
Amizur et al.

(10) Patent No.: US 11,754,674 B2
(45) Date of Patent: Sep. 12, 2023

(54) APPARATUS, SYSTEM, AND METHOD OF GENERATING RADAR TARGET INFORMATION

(71) Applicant: Intel Corporation, Santa Clara, CA (US)

(72) Inventors: Yuval Amizur, Kfar-Saba (IL); Nir Dvorecki, Herzeliya (IL); Leor Banin, Petach Tikva (IL)

(73) Assignee: INTEL CORPORATION, Santa Clara, CA (US)

( * ) Notice: Subject to any disclaimer, the term of this patent is extended or adjusted under 35 U.S.C. 154(b) by 74 days.

(21) Appl. No.: 17/167,907

(22) Filed: Feb. 4, 2021

(65) Prior Publication Data
US 2021/0341573 A1 Nov. 4, 2021

(51) Int. Cl.
*G01S 7/41* (2006.01)
*G01S 13/04* (2006.01)
*G01S 13/931* (2020.01)

(52) U.S. Cl.
CPC .............. *G01S 7/412* (2013.01); *G01S 13/04* (2013.01); *G01S 13/931* (2013.01)

(58) Field of Classification Search
CPC ........ G01S 13/931; G01S 13/89; G01S 13/04; G01S 13/06; G01S 13/4418; G01S 7/356; G01S 7/354; G01S 7/412
USPC .................................................. 342/195, 70
See application file for complete search history.

(56) References Cited

U.S. PATENT DOCUMENTS

| | | | | |
|---|---|---|---|---|
| 3,831,174 A * | 8/1974 | King | ...................... | G01S 13/528 342/104 |
| 5,877,721 A * | 3/1999 | Tsang | ...................... | G01S 7/292 342/36 |
| 7,928,896 B2 * | 4/2011 | Jin | ........................ | G01S 13/904 342/73 |
| 8,077,075 B2 * | 12/2011 | Randler | ................ | G01S 13/584 342/28 |

(Continued)

FOREIGN PATENT DOCUMENTS

| | | |
|---|---|---|
| CN | 105528796 | 4/2016 |
| CN | 110988867 | 4/2020 |

(Continued)

OTHER PUBLICATIONS

International Search Report and the Written Opinion for International Application No. PCT/US2022/011017, dated Oct. 26, 2022, 13 pages.

*Primary Examiner* — Vladimir Magloire
*Assistant Examiner* — Michael W Justice
(74) *Attorney, Agent, or Firm* — Shichrur & Co.

(57) ABSTRACT

For example, a processor may be configured to determine a plurality of potential targets based on radar data; and to identify one or more true targets in the plurality of potential targets by identifying a first potential target and a second potential target, which are at a same angle relative to the radar antenna; classifying the first potential target as a first true target based on a determination that a range between the first potential target and the radar antenna is shorter than a range between the second potential target and the radar antenna; and classifying the second potential target as a second true target or as a ghost target of the first true target according to a classification criterion.

25 Claims, 14 Drawing Sheets

(56) References Cited

U.S. PATENT DOCUMENTS

| | | | |
|---|---|---|---|
| 8,130,138 B2* | 3/2012 | Kikuchi | G01S 13/42 |
| | | | 342/72 |
| 9,229,098 B2* | 1/2016 | Gross | G01S 13/06 |
| 11,262,442 B2* | 3/2022 | Takada | G01S 7/415 |
| 11,294,031 B2* | 4/2022 | Laghezza | G01S 13/42 |
| 11,320,515 B2* | 5/2022 | Bialer | G01S 13/584 |
| 2009/0033549 A1* | 2/2009 | Jin | G01S 13/904 |
| | | | 342/25 F |
| 2009/0121915 A1* | 5/2009 | Randler | G01S 13/584 |
| | | | 342/70 |
| 2010/0214153 A1* | 8/2010 | Kikuchi | G01S 7/2921 |
| | | | 342/70 |
| 2013/0314272 A1* | 11/2013 | Gross | G01S 13/06 |
| | | | 342/70 |
| 2018/0128917 A1 | 5/2018 | Bialer | |
| 2018/0341012 A1* | 11/2018 | Takada | G01S 7/414 |
| 2019/0155304 A1 | 5/2019 | Choi | |
| 2019/0285738 A1* | 9/2019 | Iwasa | G01S 7/03 |
| 2020/0033442 A1* | 1/2020 | Gulati | G01S 7/0234 |
| 2021/0018592 A1* | 1/2021 | Laghezza | G01S 13/46 |
| 2021/0325510 A1* | 10/2021 | Bialer | G01S 13/865 |
| 2021/0341573 A1 | 11/2021 | Amizur et al. | |

FOREIGN PATENT DOCUMENTS

| | | | | |
|---|---|---|---|---|
| CN | 111481184 | | 8/2020 | |
| JP | 2021012104 A | * | 2/2021 | G01S 13/42 |

\* cited by examiner

APPARATUS, SYSTEM, AND METHOD OF GENERATING RADAR TARGET INFORMATION

TECHNICAL FIELD

Aspects described herein generally relate to generating radar target information.

BACKGROUND

Various types of devices and systems, for example, autonomous and/or robotic devices, e.g., autonomous vehicles and/or robots, may be configured to perceive and navigate through their environment using sensor data of one or more sensor types.

Conventionally, autonomous perception relies heavily on light-based sensors, such as image sensors, e.g., cameras, and/or Light Detection and Ranging (LIDAR) sensors. Such light-based sensors may perform poorly under certain conditions, such as, conditions of poor visibility, or in certain inclement weather conditions, e.g., rain, snow, hail, or other forms of precipitation, thereby limiting their usefulness or reliability.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
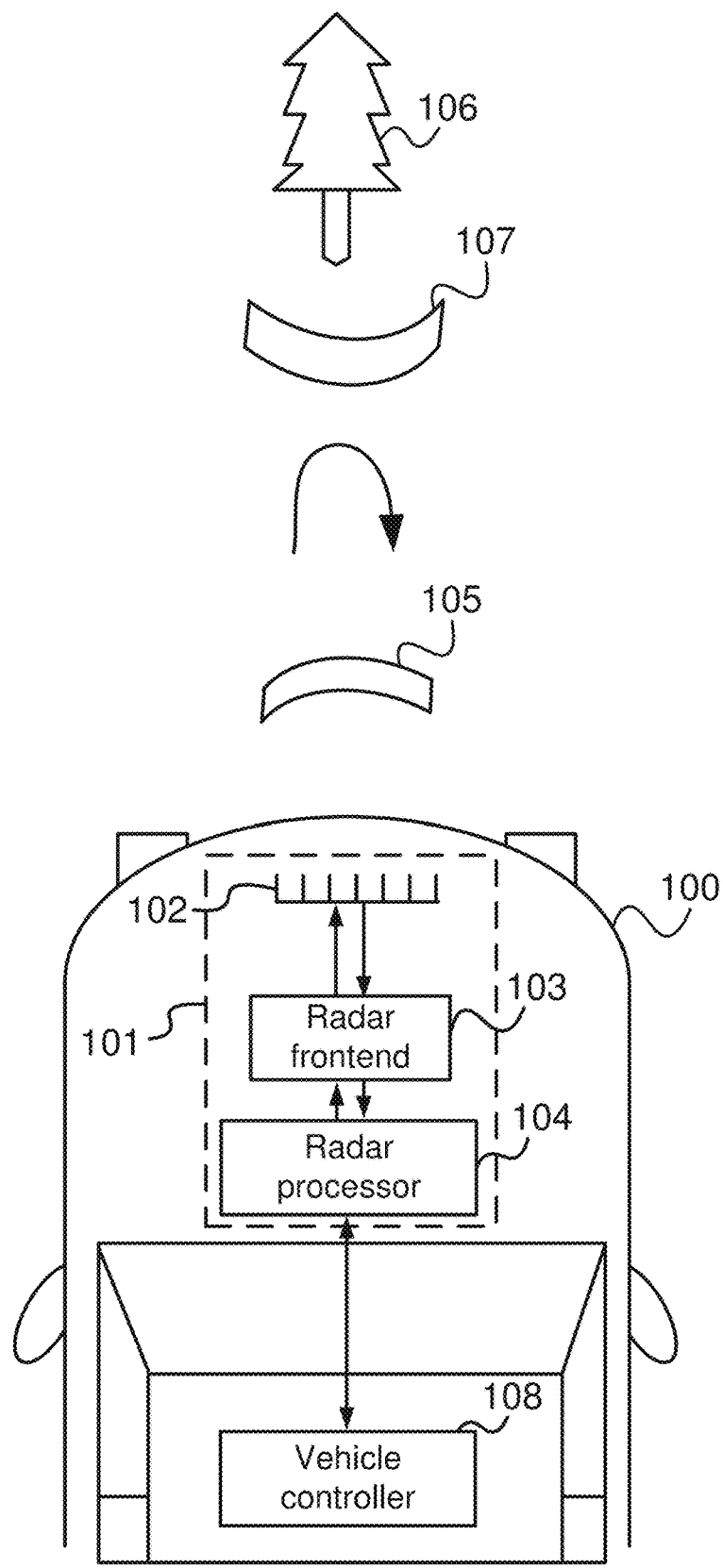
FIG. 1 is a schematic block diagram illustration of a vehicle implementing a radar, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

The words "exemplary" and "demonstrative" are used herein to mean "serving as an example, instance, demonstration, or illustration". Any aspect, embodiment, or design described herein as "exemplary" or "demonstrative" is not necessarily to be construed as preferred or advantageous over other aspects, aspects, or designs.

References to "one embodiment", "an embodiment", "demonstrative embodiment", "various aspects" "one aspect", "an aspect", "demonstrative aspect", "various aspects" etc., indicate that the embodiment(s) and/or aspects so described may include a particular feature, structure, or characteristic, but not every embodiment or aspect necessarily includes the particular feature, structure, or characteristic. Further, repeated use of the phrase "in one embodiment" or "in one aspect" does not necessarily refer to the same embodiment or aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of" with regard to a group of elements may be used herein to mean at least one element from the group consisting of the elements. For example, the phrase "at least one of" with regard to a group of elements may be used herein to mean one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/or may represent any information as understood in the art.

The terms "processor" or "controller" may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" is understood as a computer-readable medium (e.g., a non-transitory computer-readable medium) in which data or information can be stored for retrieval. References to "memory" may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" may be used to refer to any type of executable instruction and/or logic, including firmware.

A "vehicle" may be understood to include any type of driven object. By way of example, a vehicle may be a driven object with a combustion engine, an electric engine, a reaction engine, an electrically driven object, a hybrid driven object, or a combination thereof. A vehicle may be, or may include, an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, which is configured to traverse the ground, e.g., on a street, on a road, on a track, on one or more rails, off-road, or the like.

An "autonomous vehicle" may describe a vehicle capable of implementing at least one navigational change without driver input. A navigational change may describe or include a change in one or more of steering, braking, acceleration/deceleration, or any other operation relating to movement, of the vehicle. A vehicle may be described as autonomous even in case the vehicle is not fully autonomous, for example, fully operational with driver or without driver input. Autonomous vehicles may include those vehicles that can operate under driver control during certain time periods, and without driver control during other time periods. Additionally or alternatively, autonomous vehicles may include vehicles that control only some aspects of vehicle navigation, such as steering, e.g., to maintain a vehicle course between vehicle lane constraints, or some steering operations under certain circumstances, e.g., not under all circumstances, but may leave other aspects of vehicle navigation to the driver, e.g., braking or braking under certain circumstances. Additionally or alternatively, autonomous vehicles may include vehicles that share the control of one or more aspects of vehicle navigation under certain circumstances, e.g., hands-on, such as responsive to a driver input; and/or vehicles that control one or more aspects of vehicle navigation under certain circumstances, e.g., hands-off, such as independent of driver input. Additionally or alternatively, autonomous vehicles may include vehicles that control one or more aspects of vehicle navigation under certain circumstances, such as under certain environmental conditions, e.g., spatial areas, roadway conditions, or the like. In some aspects, autonomous vehicles may handle some or all aspects of braking, speed control, velocity control, steering, and/or any other additional operations, of the vehicle. An autonomous vehicle may include those vehicles that can operate without a driver. The level of autonomy of a vehicle may be described or determined by the Society of Automotive Engineers (SAE) level of the vehicle, e.g., as defined by the SAE, for example in SAE J3016 2018: *Taxonomy and definitions for terms related to driving automation systems for on road motor vehicles*, or by other relevant professional organizations. The SAE level may have a value ranging from a minimum level, e.g., level 0 (illustratively, substantially no driving automation), to a maximum level, e.g., level 5 (illustratively, full driving automation).

The phrase "vehicle operation data" may be understood to describe any type of feature related to the operation of a vehicle. By way of example, "vehicle operation data" may describe the status of the vehicle, such as, the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, or the like. More generally, "vehicle operation data" may describe or include varying features or varying vehicle operation data (illustratively, time varying features or data).

Some aspects may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

Some aspects may be used in conjunction with Radio Frequency (RF) systems, radar systems, vehicular radar systems, autonomous systems, robotic systems, detection systems, or the like.

Some demonstrative aspects may be used in conjunction with an RF frequency in a frequency band having a starting frequency above 10 Gigahertz (GHz), for example, a frequency band having a starting frequency between 10 GHz and 120 GHz. For example, some demonstrative aspects may be used in conjunction with an RF frequency having a starting frequency above 30 GHz, for example, above 45 GHz, e.g., above 60 GHz. For example, some demonstrative aspects may be used in conjunction with an automotive radar frequency band, e.g., a frequency band between 76 GHz and 81 GHz. However, other aspects may be implemented utilizing any other suitable frequency bands, for example, a frequency band above 140 GHz, a frequency band of 300 GHz, a sub Terahertz (THz) band, a THz band, an Infra Red (IR) band, and/or any other frequency band.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "communicating" as used herein with respect to a signal includes transmitting the signal and/or receiving the signal. For example, an apparatus, which is capable of communicating a signal, may include a transmitter to transmit the signal, and/or a receiver to receive the signal. The verb communicating may be used to refer to the action of transmitting or the action of receiving. In one example, the phrase "communicating a signal" may refer to the action of transmitting the signal by a transmitter, and may not necessarily include the action of receiving the signal by a receiver. In another example, the phrase "communicating a signal" may refer to the action of receiving the signal by a receiver, and may not necessarily include the action of transmitting the signal by a transmitter.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like. In one example, an antenna may be implemented as a separate element or an integrated element, for example, as an on-module antenna, an on-chip antenna, or according to any other antenna architecture.

Some demonstrative aspects are described herein with respect to RF radar signals. However, other aspects may be implemented with respect to, or in conjunction with, any other radar signals, wireless signals, IR signals, acoustic signals, optical signals, wireless communication signals, communication scheme, network, standard, and/or protocol. For example, some demonstrative aspects may be implemented with respect to systems, e.g., Light Detection Ranging (LiDAR) systems, and/or sonar systems, utilizing light and/or acoustic signals.

Reference is now made to FIG. 1, which schematically illustrates a block diagram of a vehicle 100 implementing a radar, in accordance with some demonstrative aspects.

In some demonstrative aspects, vehicle 100 may include a car, a truck, a motorcycle, a bus, a train, an airborne vehicle, a waterborne vehicle, a cart, a golf cart, an electric cart, a road agent, or any other vehicle.

In some demonstrative aspects, vehicle 100 may include a radar device 101, e.g., as described below. For example, radar device 101 may include a radar detecting device, a radar sensing device, a radar sensor, or the like, e.g., as described below.

In some demonstrative aspects, radar device 101 may be implemented as part of a vehicular system, for example, a system to be implemented and/or mounted in vehicle 100.

In one example, radar device 101 may be implemented as part of an autonomous vehicle system, an automated driving system, a driver assistance and/or support system, and/or the like.

For example, radar device 101 may be installed in vehicle 100 for detection of nearby objects, e.g., for autonomous driving.

In some demonstrative aspects, radar device 101 may be configured to detect targets in a vicinity of vehicle 100, e.g., in a far vicinity and/or a near vicinity, for example, using RF and analog chains, capacitor structures, large spiral transformers and/or any other electronic or electrical elements, e.g., as described below. In one example, radar device 101 may be mounted onto, placed, e.g., directly, onto, or attached to, vehicle 100.

In some demonstrative aspects, vehicle 100 may include a single radar device 101. In other aspects, vehicle 100 may include a plurality of radar devices 101, for example, at a plurality of locations, e.g., around vehicle 100.

In some demonstrative aspects, radar device 101 may be implemented as a component in a suite of sensors used for driver assistance and/or autonomous vehicles, for example, due to the ability of radar to operate in nearly all-weather conditions.

In some demonstrative aspects, radar device 101 may be configured to support autonomous vehicle usage, e.g., as described below.

In one example, radar device 101 may determine a class, a location, an orientation, a velocity, an intention, a perceptional understanding of the environment, and/or any other information corresponding to an object in the environment.

In another example, radar device 101 may be configured to determine one or more parameters and/or information for one or more operations and/or tasks, e.g., path planning, and/or any other tasks.

In some demonstrative aspects, radar device 101 may be configured to map a scene by measuring targets' echoes (reflectivity) and discriminating them, for example, mainly in range, velocity, azimuth and/or elevation, e.g., as described below.

In some demonstrative aspects, radar device 101 may be configured to detect, and/or sense, one or more objects, which are located in a vicinity, e.g., a far vicinity and/or a near vicinity, of the vehicle 100, and to provide one or more parameters, attributes, and/or information with respect to the objects.

In some demonstrative aspects, the objects may include other vehicles; pedestrians; traffic signs; traffic lights; roads, road elements, e.g., a pavement-road meeting, an edge line; a hazard, e.g., a tire, a box, a crack in the road surface; and/or the like.

In some demonstrative aspects, the one or more parameters, attributes and/or information with respect to the object may include a range of the objects from the vehicle 100, an angle of the object with respect to the vehicle 100, a location of the object with respect to the vehicle 100, a relative speed of the object with respect to vehicle 100, and/or the like.

In some demonstrative aspects, radar device 101 may include a Multiple Input Multiple Output (MIMO) radar device 101, e.g., as described below. In one example, the MIMO radar device may be configured to utilize "spatial filtering" processing, for example, beamforming and/or any other mechanism, for one or both of Transmit (Tx) signals and/or Receive (Rx) signals.

Some demonstrative aspects are described below with respect to a radar device, e.g., radar device 101, implemented as a MIMO radar. However, in other aspects, radar device 101 may be implemented as any other type of radar device utilizing a plurality of antenna elements, e.g., a Single Input Multiple Output (SIMO) radar or a Multiple Input Single output (MISO) radar.

Some demonstrative aspects may be implemented with respect to a radar device, e.g., radar device 101, implemented as a MIMO radar, e.g., as described below. However, in other aspects, radar device 101 may be implemented as any other type of radar, for example, an Electronic Beam Steering radar, a Synthetic Aperture Radar (SAR), adaptive and/or cognitive radars that change their transmission according to the environment and/or ego state, a reflect array radar, or the like.

In some demonstrative aspects, radar device 101 may include an antenna arrangement 102, a radar frontend 103 configured to communicate radar signals via the antenna arrangement 102, and a radar processor 104 configured to generate radar information based on the radar signals, e.g., as described below.

In some demonstrative aspects, radar processor 104 may be configured to process radar information of radar device 101 and/or to control one or more operations of radar device 101, e.g., as described below.

In some demonstrative aspects, radar processor 104 may include, or may be implemented, partially or entirely, by circuitry and/or logic, e.g., one or more processors including circuitry and/or logic, memory circuitry and/or logic. Additionally or alternatively, one or more functionalities of radar processor 104 may be implemented by logic, which may be executed by a machine and/or one or more processors, e.g., as described below.

In one example, radar processor 104 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In other aspects, radar processor 104 may be implemented by one or more additional or alternative elements of vehicle 100.

In some demonstrative aspects, radar frontend 103 may include, for example, one or more (radar) transmitters, and a one or more (radar) receivers, e.g., as described below.

In some demonstrative aspects, antenna arrangement 102 may include a plurality of antennas to communicate the radar signals. For example, antenna arrangement 102 may include multiple transmit antennas in the form of a transmit antenna array, and multiple receive antennas in the form of a receive antenna array. In another example, antenna arrangement 102 may include one or more antennas used both as transmit and receive antennas. In the latter case, the radar frontend 103, for example, may include a duplexer, e.g., a circuit to separate transmitted signals from received signals.

In some demonstrative aspects, as shown in FIG. 1, the radar frontend 103 and the antenna arrangement 102 may be controlled, e.g., by radar processor 104, to transmit a radio transmit signal 105.

In some demonstrative aspects, as shown in FIG. 1, the radio transmit signal 105 may be reflected by an object 106, resulting in an echo 107.

In some demonstrative aspects, the radar device 101 may receive the echo 107, e.g., via antenna arrangement 102 and radar frontend 103, and radar processor 104 may generate radar information, for example, by calculating information about position, radial velocity (Doppler), and/or direction of the object 106, e.g., with respect to vehicle 100.

In some demonstrative aspects, radar processor 104 may be configured to provide the radar information to a vehicle controller 108 of the vehicle 100, e.g., for autonomous driving of the vehicle 100.

In some demonstrative aspects, at least part of the functionality of radar processor 104 may be implemented as part of vehicle controller 108. In other aspects, the functionality of radar processor 104 may be implemented as part of any other element of radar device 101 and/or vehicle 100. In other aspects, radar processor 104 may be implemented, as a separate part of, or as part of any other element of radar device 101 and/or vehicle 100.

In some demonstrative aspects, vehicle controller 108 may be configured to control one or more functionalities, modes of operation, components, devices, systems and/or elements of vehicle 100.

In some demonstrative aspects, vehicle controller 108 may be configured to control one or more vehicular systems of vehicle 100, e.g., as described below.

In some demonstrative aspects, the vehicular systems may include, for example, a steering system, a braking system, a driving system, and/or any other system of the vehicle 100.

In some demonstrative aspects, vehicle controller 108 may configured to control radar device 101, and/or to process one or parameters, attributes and/or information from radar device 101.

In some demonstrative aspects, vehicle controller 108 may be configured, for example, to control the vehicular systems of the vehicle 100, for example, based on radar information from radar device 101 and/or one or more other sensors of the vehicle 100, e.g., Light Detection and Ranging (LIDAR) sensors, camera sensors, and/or the like.

In one example, vehicle controller 108 may control the steering system, the braking system, and/or any other vehicular systems of vehicle 100, for example, based on the information from radar device 101, e.g., based on one or more objects detected by radar device 101.

In other aspects, vehicle controller 108 may be configured to control any other additional or alternative functionalities of vehicle 100.

Some demonstrative aspects are described herein with respect to a radar device 101 implemented in a vehicle, e.g., vehicle 100. In other aspects a radar device, e.g., radar device 101, may be implemented as part of any other element of a traffic system or network, for example, as part of a road infrastructure, and/or any other element of a traffic network or system. Other aspects may be implemented with respect to any other system, environment and/or apparatus, which may be implemented in any other object, environment, location, or place. For example, radar device 101 may be part of a non-vehicular device, which may be implemented, for example, in an indoor location, a stationary infrastructure outdoors, or any other location.

In some demonstrative aspects, radar device 101 may be configured to support security usage. In one example, radar device 101 may be configured to determine a nature of an operation, e.g., a human entry, an animal entry, an environmental movement, and the like, to identity a threat level of a detected event, and/or any other additional or alternative operations.

Some demonstrative aspects may be implemented with respect to any other additional or alternative devices and/or systems, for example, for a robot, e.g., as described below.

In other aspects, radar device 101 may be configured to support any other usages and/or applications.

Figure 2:
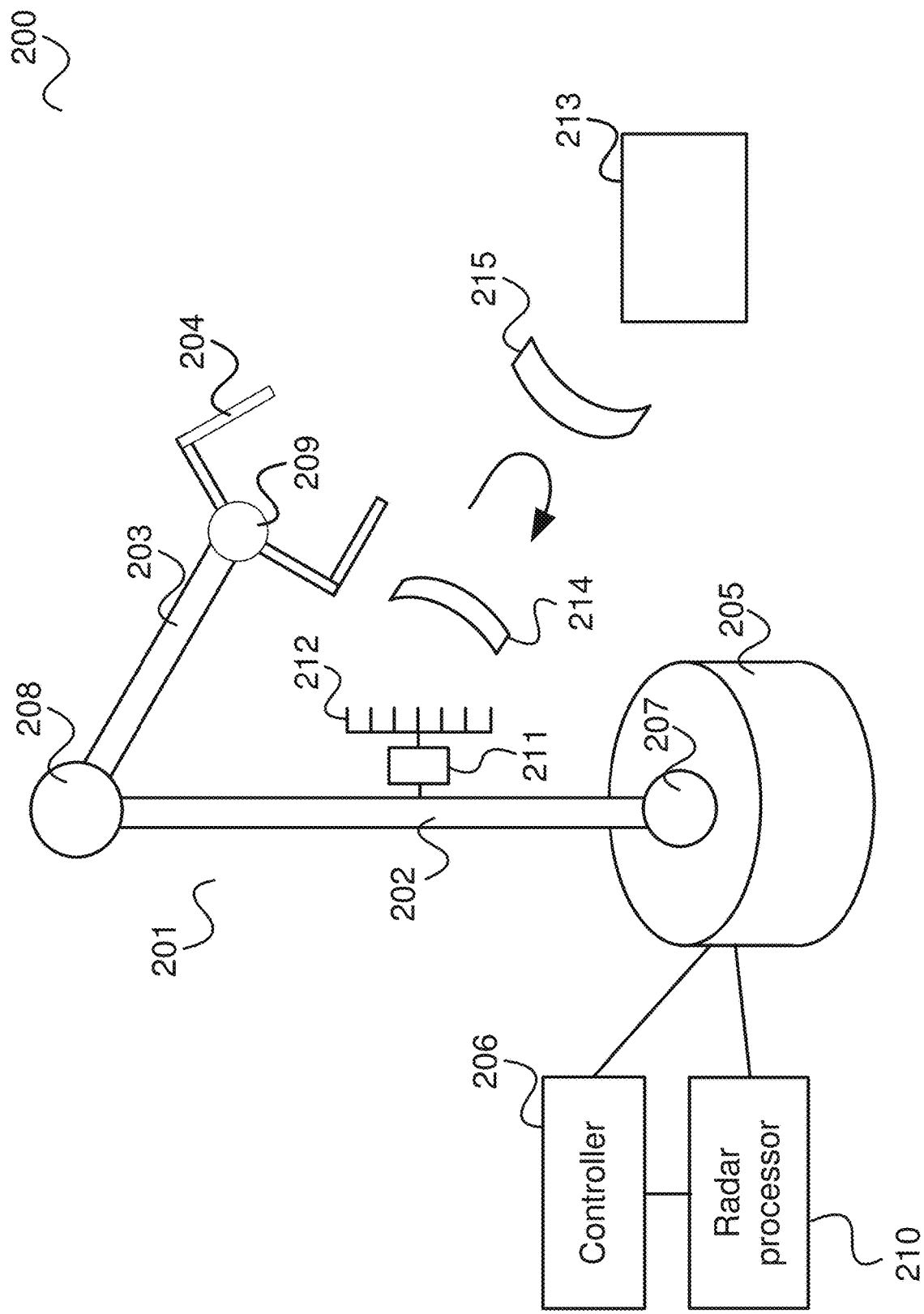
FIG. 2 is a schematic block diagram illustration of a robot implementing a radar, in accordance with some demonstrative aspects.

Reference is now made to FIG. 2, which schematically illustrates a block diagram of a robot 200 implementing a radar, in accordance with some demonstrative aspects.

In some demonstrative aspects, robot 200 may include a robot arm 201. The robot 200 may be implemented, for example, in a factory for handling an object 213, which may be, for example, a part that should be affixed to a product that is being manufactured. The robot arm 201 may include a plurality of movable members, for example, movable members 202, 203, 204, and a support 205. Moving the movable members 202, 203, and/or 204 of the robot arm 201, e.g., by actuation of associated motors, may allow physical interaction with the environment to carry out a task, e.g., handling the object 213.

In some demonstrative aspects, the robot arm 201 may include a plurality of joint elements, e.g., joint elements 207, 208, 209, which may connect, for example, the members 202, 203, and/or 204 with each other, and with the support 205. For example, a joint element 207, 208, 209 may have one or more joints, each of which may provide rotatable motion, e.g., rotational motion, and/or translatory motion, e.g., displacement, to associated members and/or motion of members relative to each other. The movement of the members 202, 203, 204 may be initiated by suitable actuators.

In some demonstrative aspects, the member furthest from the support 205, e.g., member 204, may also be referred to as the end-effector 204 and may include one or more tools, such as, a claw for gripping an object, a welding tool, or the like. Other members, e.g., members 202, 203, closer to the support 205, may be utilized to change the position of the end-effector 204, e.g., in three-dimensional space. For example, the robot arm 201 may be configured to function similarly to a human arm, e.g., possibly with a tool at its end.

In some demonstrative aspects, robot 200 may include a (robot) controller 206 configured to implement interaction with the environment, e.g., by controlling the robot arm's actuators, according to a control program, for example, in order to control the robot arm 201 according to the task to be performed.

In some demonstrative aspects, an actuator may include a component adapted to affect a mechanism or process in response to being driven. The actuator can respond to commands given by the controller 206 (the so-called activation) by performing mechanical movement. This means that an actuator, typically a motor (or electromechanical converter), may be configured to convert electrical energy into mechanical energy when it is activated (i.e. actuated).

In some demonstrative aspects, controller 206 may be in communication with a radar processor 210 of the robot 200.

In some demonstrative aspects, a radar fronted 211 and a radar antenna arrangement 212 may be coupled to the radar processor 210. In one example, radar fronted 211 and/or radar antenna arrangement 212 may be included, for example, as part of the robot arm 201.

In some demonstrative aspects, the radar frontend 211, the radar antenna arrangement 212 and the radar processor 210 may be operable as, and/or may be configured to form, a radar device. For example, antenna arrangement 212 may be configured to perform one or more functionalities of antenna arrangement 102 (FIG. 1), radar frontend 211 may be configured to perform one or more functionalities of radar frontend 103 (FIG. 1), and/or radar processor 210 may be configured to perform one or more functionalities of radar processor 104 (FIG. 1), e.g., as described above.

In some demonstrative aspects, for example, the radar frontend 211 and the antenna arrangement 212 may be controlled, e.g., by radar processor 210, to transmit a radio transmit signal 214.

In some demonstrative aspects, as shown in FIG. 2, the radio transmit signal 214 may be reflected by the object 213, resulting in an echo 215.

In some demonstrative aspects, the echo 215 may be received, e.g., via antenna arrangement 212 and radar frontend 211, and radar processor 210 may generate radar information, for example, by calculating information about position, speed (Doppler) and/or direction of the object 213, e.g., with respect to robot arm 201.

In some demonstrative aspects, radar processor 210 may be configured to provide the radar information to the robot controller 206 of the robot arm 201, e.g., to control robot arm 201. For example, robot controller 206 may be configured to control robot arm 201 based on the radar information, e.g., to grab the object 213 and/or to perform any other operation.

Figure 3:
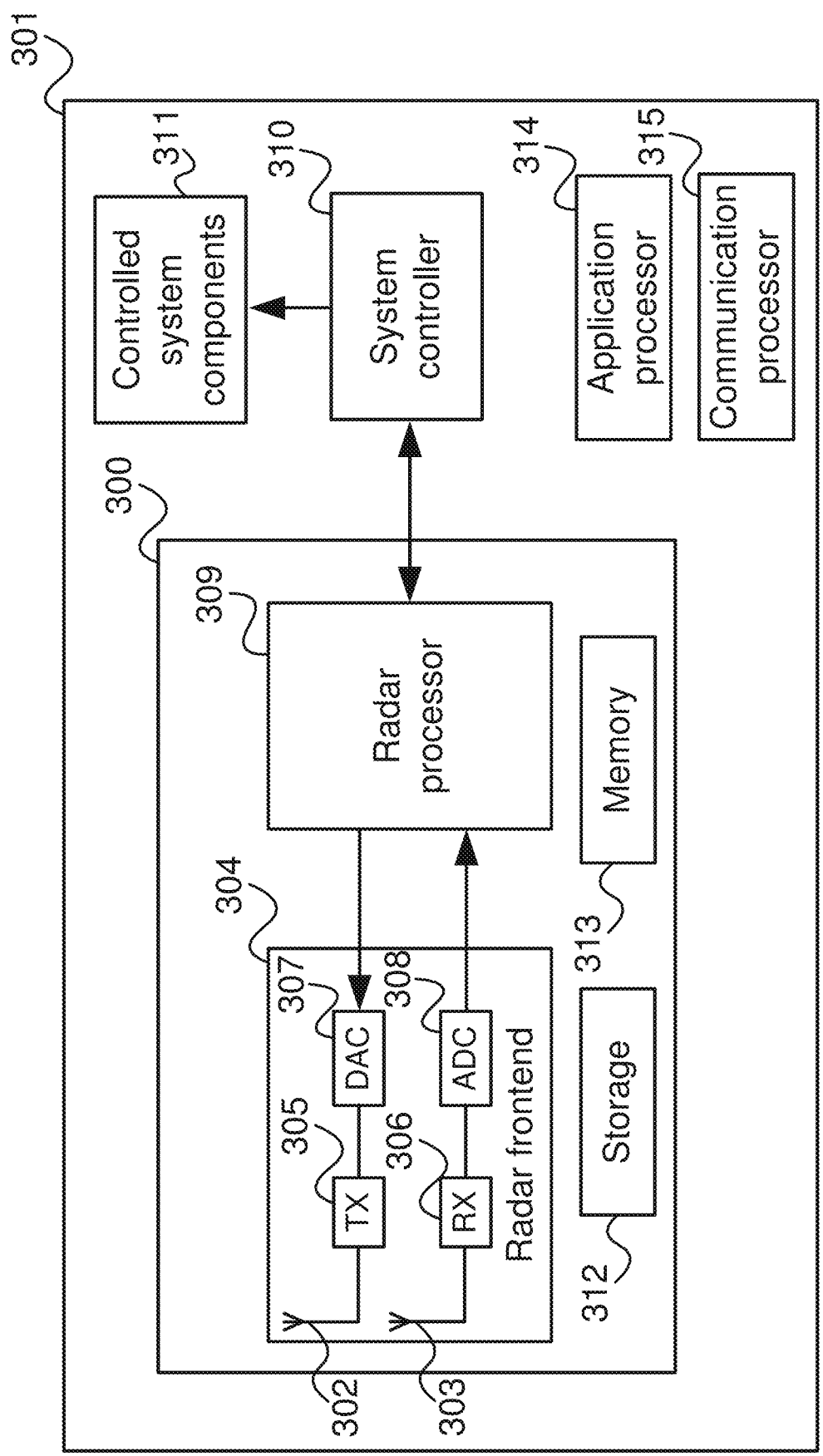
FIG. 3 is a schematic block diagram illustration of a radar apparatus, in accordance with some demonstrative aspects.

Reference is made to FIG. 3, which schematically illustrates a radar apparatus 300, in accordance with some demonstrative aspects.

In some demonstrative aspects, radar apparatus 300 may be implemented as part of a device or system 301, e.g., as described below.

For example, radar apparatus 300 may be implemented as part of, and/or may configured to perform one or more operations and/or functionalities of, the devices or systems described above with reference to FIG. 1 an/or FIG. 2. In other aspects, radar apparatus 300 may be implemented as part of any other device or system 301.

In some demonstrative aspects, radar device 300 may include an antenna arrangement, which may include one or more transmit antennas 302 and one or more receive antennas 303. In other aspects, any other antenna arrangement may be implemented.

In some demonstrative aspects, radar device 300 may include a radar frontend 304, and a radar processor 309.

In some demonstrative aspects, as shown in FIG. 3, the one or more transmit antennas 302 may be coupled with a transmitter (or transmitter arrangement) 305 of the radar frontend 304; and/or the one or more receive antennas 303 may be coupled with a receiver (or receiver arrangement) 306 of the radar frontend 304, e.g., as described below.

In some demonstrative aspects, transmitter 305 may include one or more elements, for example, an oscillator, a power amplifier and/or one or more other elements, configured to generate radio transmit signals to be transmitted by the one or more transmit antennas 302, e.g., as described below.

In some demonstrative aspects, for example, radar processor 309 may provide digital radar transmit data values to the radar frontend 304. For example, radar frontend 304 may include a Digital-to-Analog Converter (DAC) 307 to convert the digital radar transmit data values to an analog transmit signal. The transmitter 305 may convert the analog transmit signal to a radio transmit signal which is to be transmitted by transmit antennas 302.

In some demonstrative aspects, receiver 306 may include one or more elements, for example, one or more mixers, one or more filters and/or one or more other elements, configured to process, down-convert, radio signals received via the one or more receive antennas 303, e.g., as described below.

In some demonstrative aspects, for example, receiver 306 may convert a radio receive signal received via the one or more receive antennas 303 into an analog receive signal. The radar frontend 304 may include an Analog-to-Digital (ADC) Converter 308 to generate digital radar reception data values based on the analog receive signal. For example, radar frontend 304 may provide the digital radar reception data values to the radar processor 309.

In some demonstrative aspects, radar processor 309 may be configured to process the digital radar reception data values, for example, to detect one or more objects, e.g., in an environment of the device/system 301. This detection may include, for example, the determination of information including one or more of range, speed (Doppler), direction, and/or any other information, of one or more objects, e.g., with respect to the system 301.

In some demonstrative aspects, radar processor 309 may be configured to provide the determined radar information to a system controller 310 of device/system 301. For example, system controller 310 may include a vehicle controller, e.g., if device/system 301 includes a vehicular device/system, a robot controller, e.g., if device/system 301 includes a robot device/system, or any other type of controller for any other type of device/system 301.

In some demonstrative aspects, system controller 310 may be configured to control one or more controlled system components 311 of the system 301, e.g. a motor, a brake, steering, and the like, e.g. by one or more corresponding actuators.

In some demonstrative aspects, radar device 300 may include a storage 312 or a memory 313, e.g., to store information processed by radar 300, for example, digital radar reception data values being processed by the radar processor 309, radar information generated by radar processor 309, and/or any other data to be processed by radar processor 309.

In some demonstrative aspects, device/system 301 may include, for example, an application processor 314 and/or a communication processor 315, for example, to at least partially implement one or more functionalities of system controller 310 and/or to perform communication between system controller 310, radar device 300, the controlled system components 311, and/or one or more additional elements of device/system 301.

In some demonstrative aspects, radar device 300 may be configured to generate and transmit the radio transmit signal in a form, which may support determination of range, speed, and/or direction, e.g., as described below.

For example, a radio transmit signal of a radar may be configured to include a plurality of pulses. For example, a pulse transmission may include the transmission of short high-power bursts in combination with times during which the radar device listens for echoes.

For example, in order to more optimally support a highly dynamic situation, e.g., in an automotive scenario, a continuous wave (CW) may instead be used as the radio transmit signal. However, a continuous wave, e.g., with constant frequency, may support velocity determination, but may not allow range determination, e.g., due to the lack of a time mark that could allow distance calculation.

In some demonstrative aspects, radio transmit signal 105 (FIG. 1) may be transmitted according to technologies such as, for example, Frequency-Modulated continuous wave (FMCW) radar, Phase-Modulated Continuous Wave (PMCW) radar, Orthogonal Frequency Division Multiplexing (OFDM) radar, and/or any other type of radar technology, which may support determination of range, velocity, and/or direction, e.g., as described below.

Figure 4:
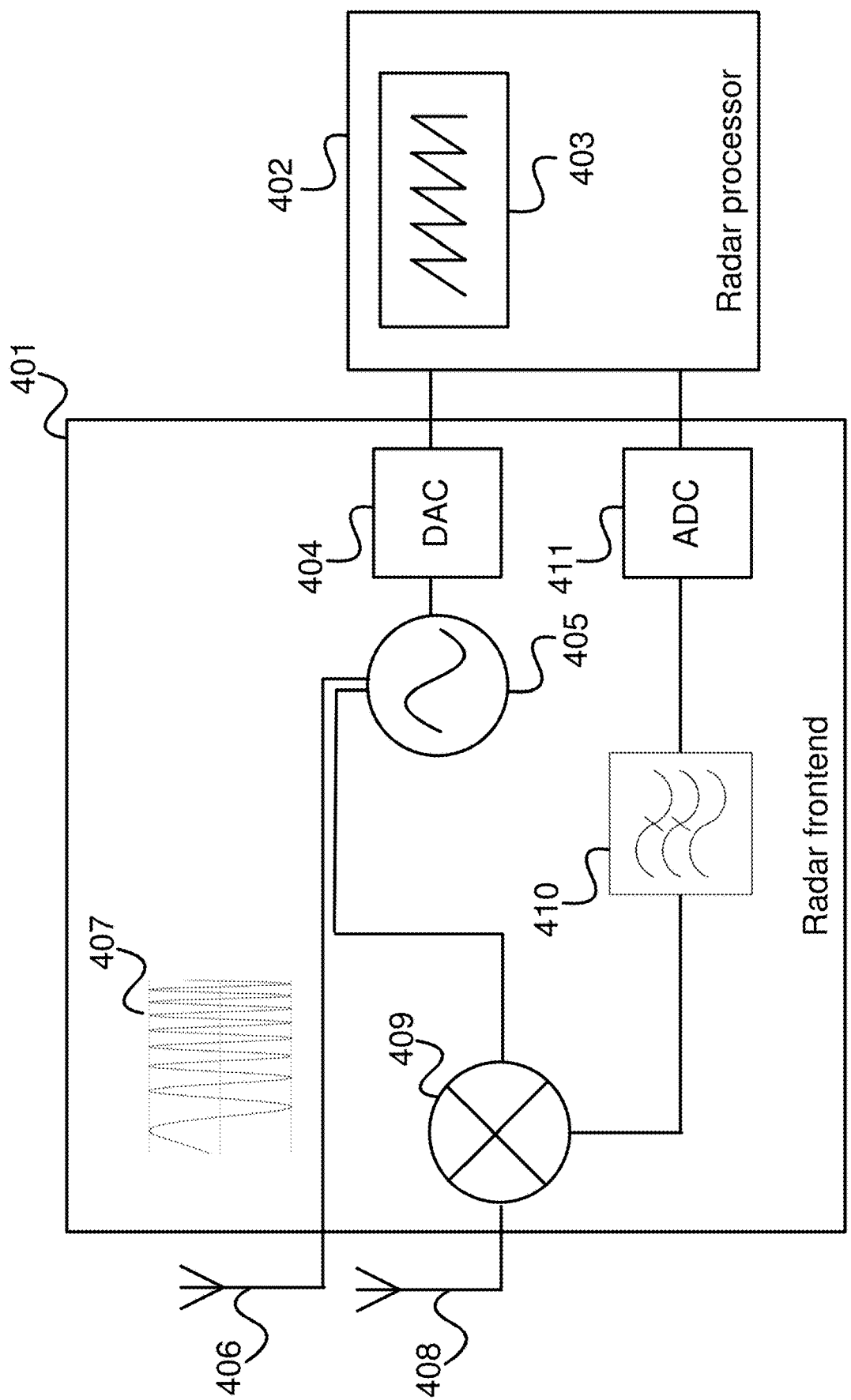
FIG. 4 is a schematic block diagram illustration of a Frequency-Modulated Continuous Wave (FMCW) radar apparatus, in accordance with some demonstrative aspects.

Reference is made to FIG. 4, which schematically illustrates a FMCW radar apparatus, in accordance with some demonstrative aspects.

In some demonstrative aspects, FMCW radar device 400 may include a radar frontend 401, and a radar processor 402. For example, radar frontend 304 (FIG. 3) may include one or more elements of, and/or may perform one or more operations and/or functionalities of, radar frontend 401; and/or radar processor 309 (FIG. 3) may include one or more elements of, and/or may perform one or more operations and/or functionalities of, radar processor 402.

In some demonstrative aspects, FMCW radar device 400 may be configured to communicate radio signals according to an FMCW radar technology, e.g., rather than sending a radio transmit signal with a constant frequency.

In some demonstrative aspects, radio frontend 401 may be configured to ramp up and reset the frequency of the transmit signal, e.g., periodically, for example, according to a saw tooth waveform 403. In other aspects, a triangle waveform, or any other suitable waveform may be used.

In some demonstrative aspects, for example, radar processor 402 may be configured to provide waveform 403 to frontend 401, for example, in digital form, e.g., as a sequence of digital values.

In some demonstrative aspects, radar frontend 401 may include a DAC 404 to convert waveform 403 into analog form, and to supply it to a voltage-controlled oscillator 405. For example, oscillator 405 may be configured to generate an output signal, which may be frequency-modulated in accordance with the waveform 403.

In some demonstrative aspects, oscillator 405 may be configured to generate the output signal including a radio transmit signal, which may be fed to and sent out by one or more transmit antennas 406.

In some demonstrative aspects, the radio transmit signal generated by the oscillator 405 may have the form of a sequence of chirps 407, which may be the result of the modulation of a sinusoid with the saw tooth waveform 403.

In one example, a chirp 407 may correspond to the sinusoid of the oscillator signal frequency-modulated by a "tooth" of the saw tooth waveform 403, e.g., from the minimum frequency to the maximum frequency.

In some demonstrative aspects, FMCW radar device 400 may include one or more receive antennas 408 to receive a radio receive signal. The radio receive signal may be based on the echo of the radio transmit signal, e.g., in addition to any noise, interference, or the like.

In some demonstrative aspects, radar frontend 401 may include a mixer 409 to mix the radio transmit signal with the radio receive signal into a mixed signal.

In some demonstrative aspects, radar frontend 401 may include a filter, e.g., a Low Pass Filter (LPF) 410, which may be configured to filter the mixed signal from the mixer 409 to provide a filtered signal. For example, radar frontend 401 may include an ADC 411 to convert the filtered signal into digital reception data values, which may be provided to radar processor 402. In another example, the filter 410 may be a digital filter, and the ADC 411 may be arranged between the mixer 409 and the filter 410.

In some demonstrative aspects, radar processor 402 may be configured to process the digital reception data values to provide radar information, for example, including range, speed (velocity/Doppler), and/or direction (AoA) information of one or more objects.

In some demonstrative aspects, radar processor 402 may be configured to perform a first Fast Fourier Transform (FFT) (also referred to as "range FFT") to extract a delay response, which may be used to extract range information, and/or a second FFT (also referred to as "Doppler FFT") to extract a Doppler shift response, which may be used to extract velocity information, from the digital reception data values.

In other aspects, any other additional or alternative methods may be utilized to extract range information. In one example, in a digital radar implementation, a correlation with the transmitted signal may be used, e.g., according to a matched filter implementation.

Figure 5:
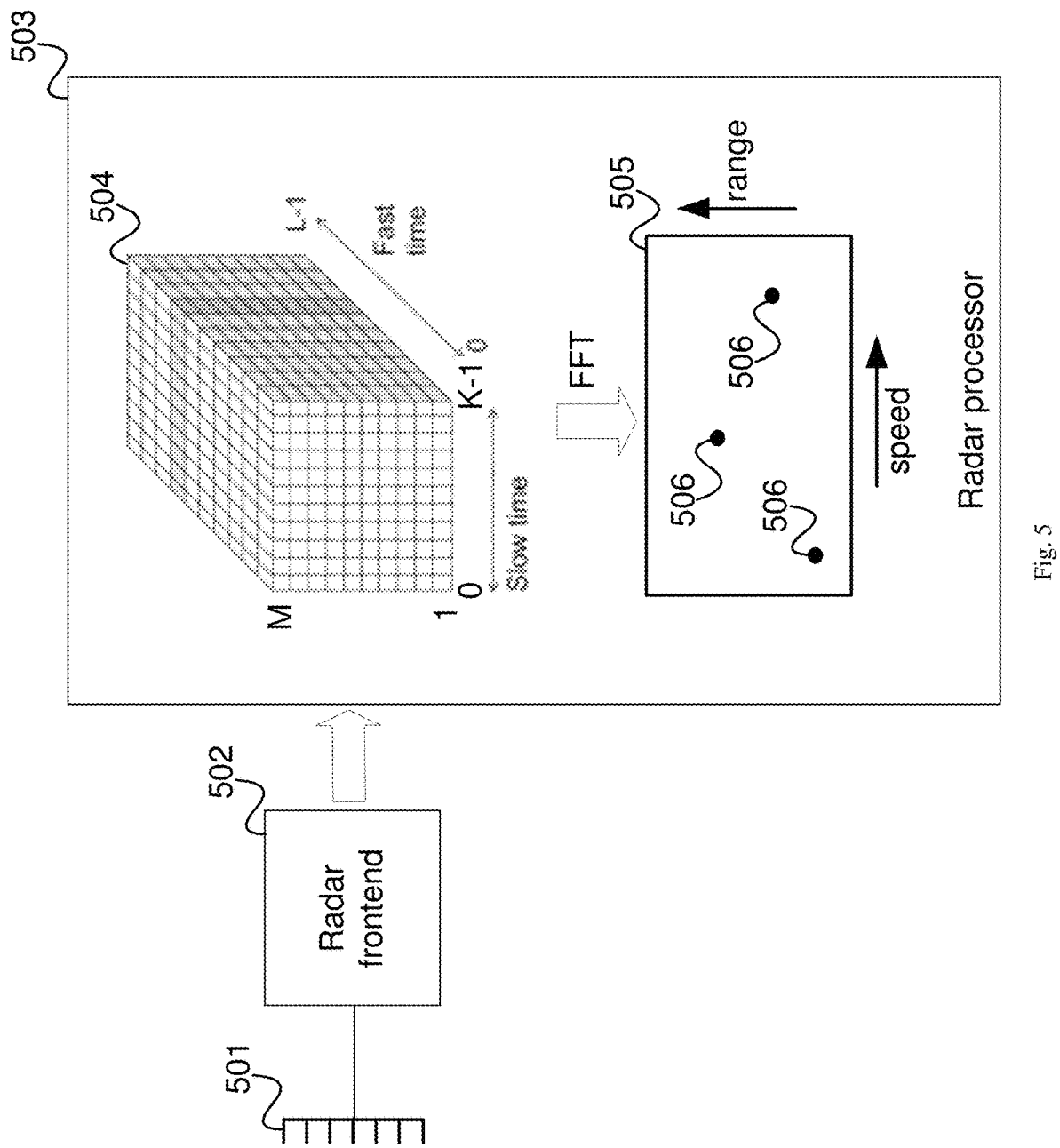
FIG. 5 is a schematic illustration of an extraction scheme, which may be implemented to extract range and speed (Doppler) estimations from digital reception radar data values, in accordance with some demonstrative aspects.

Reference is made to FIG. 5, which schematically illustrates an extraction scheme, which may be implemented to extract range and speed (Doppler) estimations from digital reception radar data values, in accordance with some demonstrative aspects. For example, radar processor 104 (FIG. 1), radar processor 210 (FIG. 2), radar processor 309 (FIG. 3), and/or radar processor 402 (FIG. 4), may be configured to extract range and/or speed (Doppler) estimations from digital reception radar data values according to one or more aspects of the extraction scheme of FIG. 5.

In some demonstrative aspects, as shown in FIG. 5, a radio receive signal, e.g., including echoes of a radio transmit signal, may be received by a receive antenna array 501. The radio receive signal may be processed by a radio radar frontend 502 to generate digital reception data values, e.g., as described above. The radio radar frontend 502 may provide the digital reception data values to a radar processor 503, which may process the digital reception data values to provide radar information, e.g., as described above.

In some demonstrative aspects, the digital reception data values may be represented in the form of a data cube 504. For example, the data cube 504 may include digitized samples of the radio receive signal, which is based on a radio signal transmitted from a transmit antenna and received by M receive antennas. In some demonstrative aspects, for example, with respect to a MIMO implementation, there may be multiple transmit antennas, and the number of samples may be multiplied accordingly.

In some demonstrative aspects, a layer of the data cube 504, for example, a horizontal layer of the data cube 504, may include samples of an antenna, e.g., a respective antenna of the M antennas.

In some demonstrative aspects, data cube 504 may include samples for K chirps. For example, as shown in FIG. 5, the samples of the chirps may be arranged in a so-called "slow time"-direction.

In some demonstrative aspects, the data cube 504 may include L samples, e.g., L=512 or any other number of samples, for a chirp, e.g., per each chirp. For example, as shown in FIG. 5, the samples per chirp may be arranged in a so-called "fast time"-direction of the data cube 504.

In some demonstrative aspects, radar processor 503 may be configured to process a plurality of samples, e.g., L samples collected for each chirp and for each antenna, by a first FFT. The first FFT may be performed, for example, for each chirp and each antenna, such that a result of the processing of the data cube 504 by the first FFT may again have three dimensions, and may have the size of the data cube 504 while including values for L range bins, e.g., instead of the values for the L sampling times.

In some demonstrative aspects, radar processor 503 may be configured to process the result of the processing of the data cube 504 by the first FFT, for example, by processing the result according to a second FFT along the chirps, e.g., for each antenna and for each range bin.

For example, the first FFT may be in the "fast time" direction, and the second FFT may be in the "slow time" direction.

In some demonstrative aspects, the result of the second FFT may provide, e.g., when aggregated over the antennas, a range/Doppler (R/D) map 505. The R/D map may have FFT peaks 506, for example, including peaks of FFT output values (in terms of absolute values) for certain range/speed combinations, e.g., for range/Doppler bins. For example, a range/Doppler bin may correspond to a range bin and a Doppler bin. For example, radar processor 503 may consider a peak as potentially corresponding to an object, e.g., of the range and speed corresponding to the peak's range bin and speed bin.

In some demonstrative aspects, the extraction scheme of FIG. 5 may be implemented for an FMCW radar, e.g., FMCW radar 400 (FIG. 4), as described above. In other aspects, the extraction scheme of FIG. 5 may be implemented for any other radar type. In one example, the radar processor 503 may be configured to determine a range/Doppler map 505 from digital reception data values of a PMCW radar, an OFDM radar, or any other radar technologies. For example, in adaptive or cognitive radar, the pulses in a frame, the waveform and/or modulation may be changed over time, e.g., according to the environment.

Referring back to FIG. 3, in some demonstrative aspects, receive antenna arrangement 303 may be implemented using a receive antenna array having a plurality of receive antennas (or receive antenna elements). For example, radar processor 309 may be configured to determine an angle of arrival of the received radio signal, e.g., echo 105 (FIG. 1) and/or echo 215 (FIG. 2). For example, radar processor 309 may be configured to determine a direction of a detected object, e.g., with respect to the device/system 301, for example, based on the angle of arrival of the received radio signal, e.g., as described below.

Figure 6:
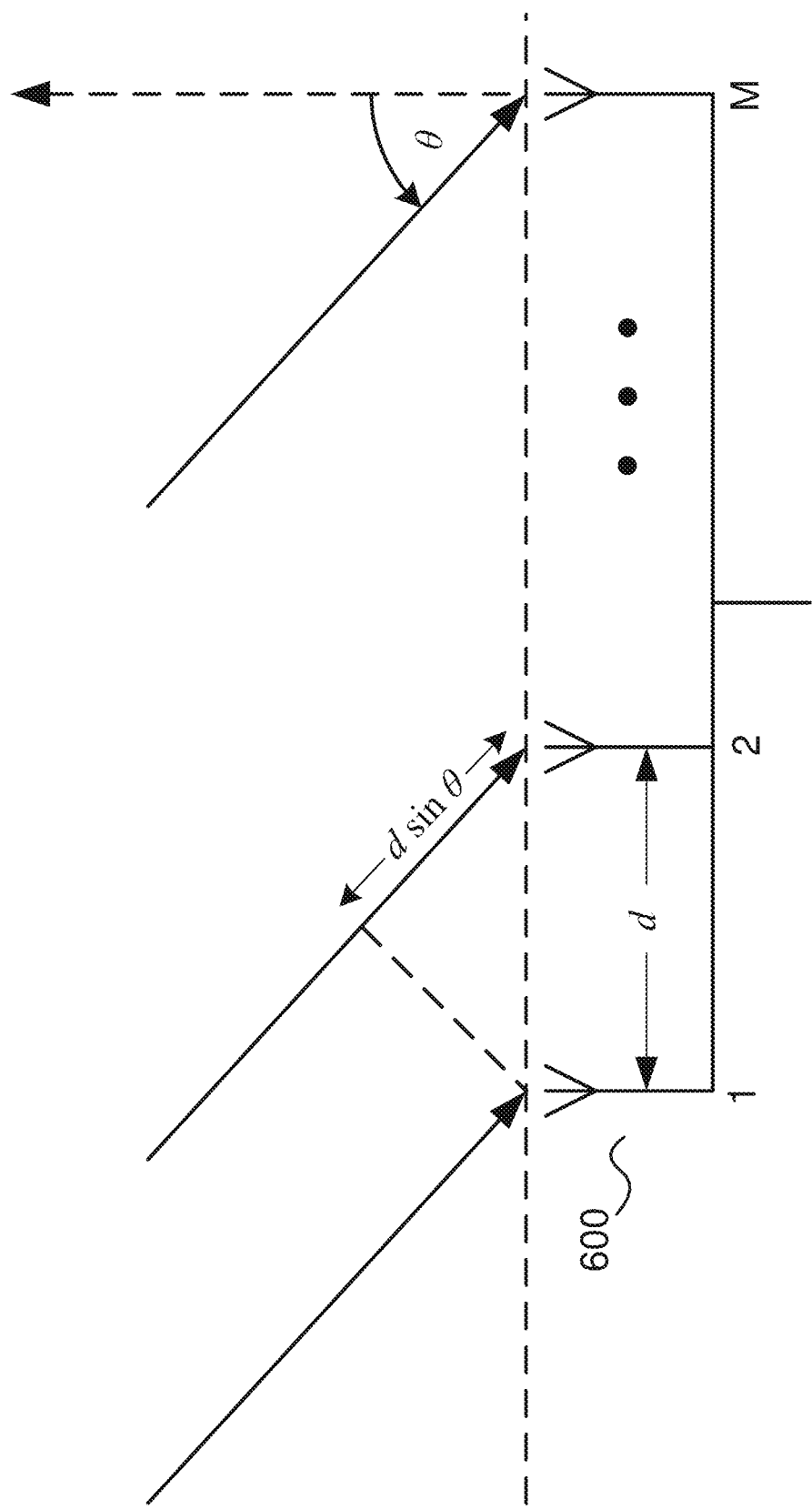
FIG. 6 is a schematic illustration of an angle-determination scheme, which may be implemented to determine Angle of Arrival (AoA) information based on an incoming radio signal received by a receive antenna array, in accordance with some demonstrative aspects.

Reference is made to FIG. 6, which schematically illustrates an angle-determination scheme, which may be implemented to determine Angle of Arrival (AoA) information based on an incoming radio signal received by a receive antenna array 600, in accordance with some demonstrative aspects.

FIG. 6 depicts an angle-determination scheme based on received signals at the receive antenna array. In some demonstrative aspects, for example, in a virtual MIMO array, the angle-determination may also be based on the signals transmitted by the array of Tx antennas.

FIG. 6 depicts a one-dimensional angle-determination scheme. Other multi-dimensional angle determination schemes, e.g., a two-dimensional scheme or a three-dimensional scheme, may be implemented.

In some demonstrative aspects, as shown in FIG. 6, the receive antenna array 600 may include M antennas (numbered, from left to right, 1 to M).

As shown by the arrows in FIG. 6, it is assumed that an echo is coming from an object located at the top left direction. Accordingly, the direction of the echo, e.g., the incoming radio signal, may be towards the bottom right. According to this example, the further to the left a receive antenna is located, the earlier it will receive a certain phase of the incoming radio signal.

For example, a phase difference, denoted Δφ, between two antennas of the receive antenna array 601 may be determined, e.g., as follows:

$$\Delta\varphi = \frac{2\pi}{\lambda} \cdot d \cdot \sin(\theta)$$

wherein λ denotes a wavelength of the incoming radio signal, d denotes a distance between the two antennas, and θ denotes an angle of arrival of the incoming radio signal, e.g., with respect to a normal direction of the array.

In some demonstrative aspects, radar processor 309 (FIG. 3) may be configured to utilize this relationship between phase and angle of the incoming radio signal, for example, to determine the angle of arrival of echoes, for example by performing an FFT, e.g., a third FFT ("angular FFT") over the antennas.

In some demonstrative aspects, multiple transmit antennas, e.g., in the form of an antenna array having multiple transmit antennas, may be used, for example, to increase the spatial resolution, e.g., to provide high-resolution radar information. For example, a MIMO radar device may utilize a virtual MIMO radar antenna, which may be formed as a convolution of a plurality of transmit antennas convolved with a plurality of receive antennas.

Figure 7:
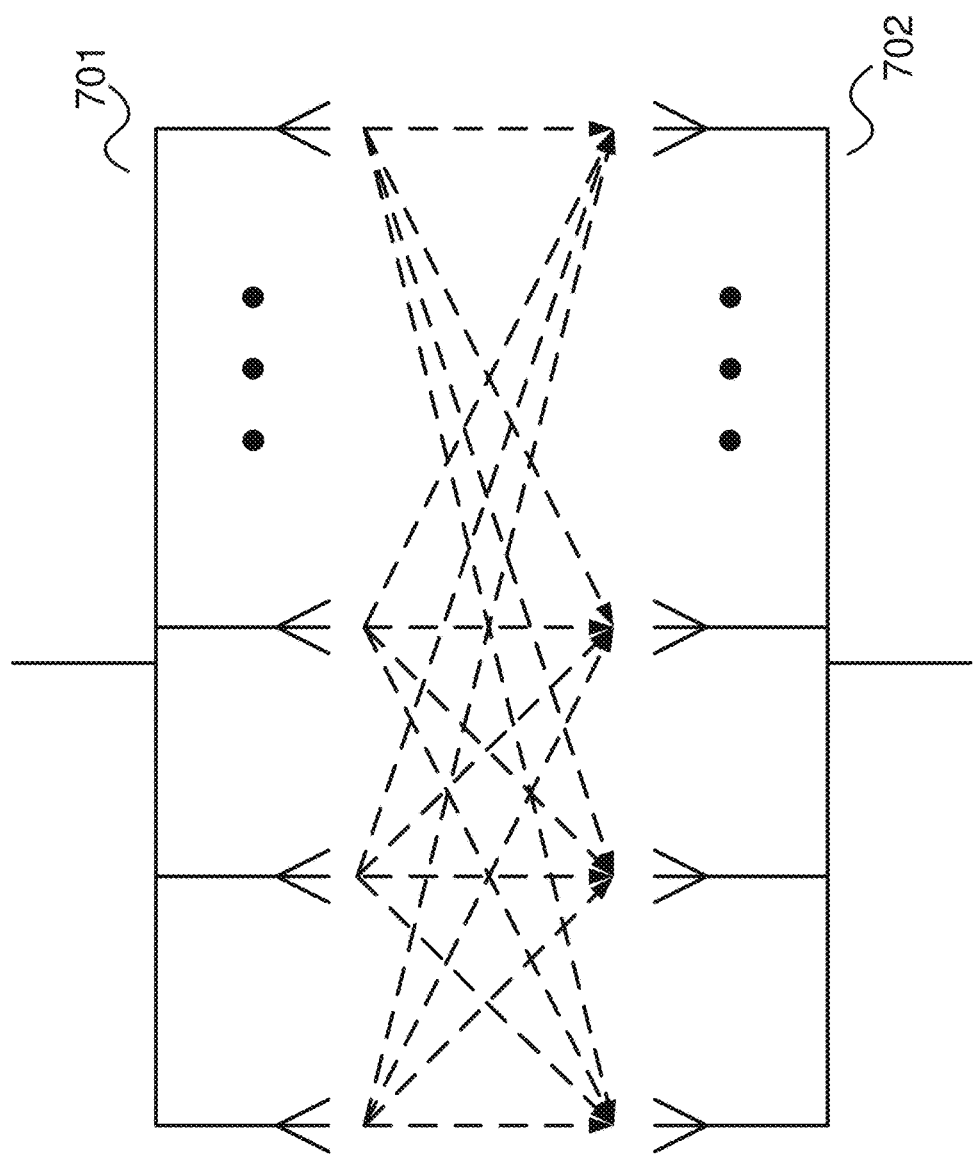
FIG. 7 is a schematic illustration of a Multiple-Input-Multiple-Output (MIMO) radar antenna scheme, which may be implemented based on a combination of Transmit (Tx) and Receive (Rx) antennas, in accordance with some demonstrative aspects.

Reference is made to FIG. 7, which schematically illustrates a MIMO radar antenna scheme, which may be implemented based on a combination of Transmit (Tx) and Receive (Rx) antennas, in accordance with some demonstrative aspects.

In some demonstrative aspects, as shown in FIG. 7, a radar MIMO arrangement may include a transmit antenna array 701 and a receive antenna array 702. For example, the one or more transmit antennas 302 (FIG. 3) may be implemented to include transmit antenna array 701, and/or the one or more receive antennas 303 (FIG. 3) may be implemented to include receive antenna array 702.

In some demonstrative aspects, antenna arrays including multiple antennas both for transmitting the radio transmit signals and for receiving echoes of the radio transmit signals, may be utilized to provide a plurality of virtual channels as illustrated by the dashed lines in FIG. 7. For example, a virtual channel may be formed as a convolution, for example, as a Kronecker product, between a transmit antenna and a receive antenna, e.g., representing a virtual steering vector of the MIMO radar.

In some demonstrative aspects, a transmit antenna, e.g., each transmit antenna, may be configured to send out an individual radio transmit signal, e.g., having a phase associated with the respective transmit antenna.

For example, an array of N transmit antennas and M receive antennas may be implemented to provide a virtual MIMO array of size N×M. For example, the virtual MIMO array may be formed according to the Kronecker product operation applied to the Tx and Rx steering vectors.

Figure 8:
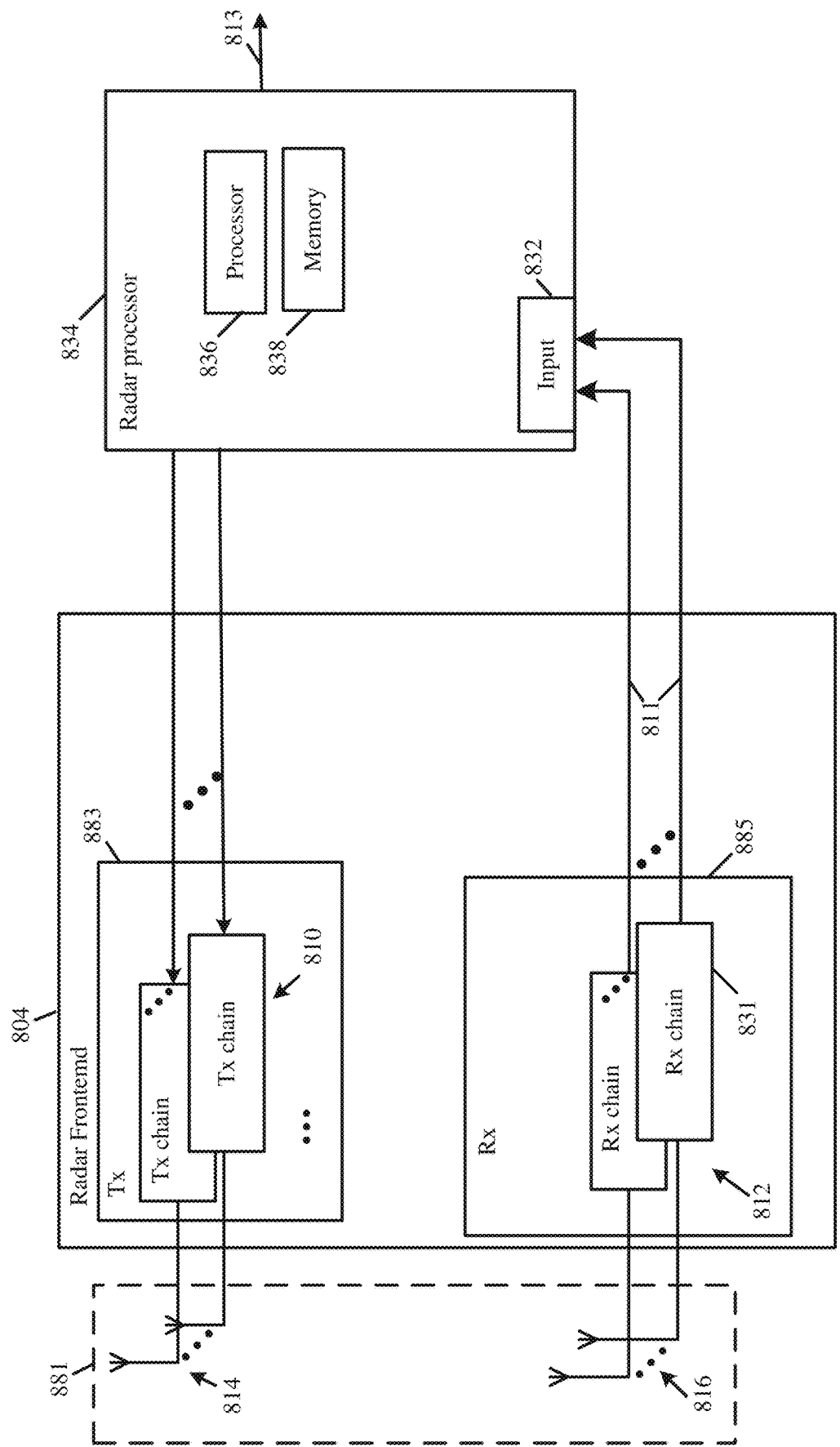
FIG. 8 is a schematic block diagram illustration of a radar frontend and a radar processor, in accordance with some demonstrative aspects.

Reference is made to FIG. 8, which schematically illustrates a radar frontend 804 and a radar processor 834, in accordance with some demonstrative aspects. For example, radar frontend 103 (FIG. 1), radar frontend 211 (FIG. 1), radar frontend 304 (FIG. 3), radar frontend 401 (FIG. 4), and/or radar frontend 502 (FIG. 5), may include one or more elements of radar frontend 804, and/or may perform one or more operations and/or functionalities of radar frontend 804.

In some demonstrative aspects, radar frontend 804 may be implemented as part of a radar utilizing a radar antenna 881 including a plurality of Tx antennas 814 configured to transmit a plurality of Tx RF signals (also referred to as "Tx radar signals"); and a plurality of Rx antennas 816 configured to receive a plurality of Rx RF signals (also referred to as "Rx radar signals"), for example, based on the Tx radar signals, e.g., as described below.

In some demonstrative aspects, radar antenna 881 may include a MIMO radar antenna 881 including the plurality of Tx antennas 814 and the plurality of Rx antennas 816.

In some demonstrative aspects, MIMO antenna array 881, antennas 814, and/or antennas 816 may include or may be part of any type of antennas suitable for transmitting and/or receiving radar signals. For example, MIMO antenna array 881, antennas 814, and/or antennas 816, may be implemented as part of any suitable configuration, structure, and/or arrangement of one or more antenna elements, components, units, assemblies, and/or arrays. For example, MIMO antenna array 881, antennas 814, and/or antennas 816, may be implemented as part of a phased array antenna, a multiple element antenna, a set of switched beam antennas, and/or the like. In some aspects, MIMO antenna array 881, antennas 814, and/or antennas 816, may be implemented to support transmit and receive functionalities using separate transmit and receive antenna elements. In some aspects, MIMO antenna array 881, antennas 814, and/or antennas 816, may be implemented to support transmit and receive functionalities using common and/or integrated transmit/receive elements.

In some demonstrative aspects, MIMO radar antenna 881 may include a rectangular MIMO antenna array, and/or curved array, e.g., shaped to fit a vehicle design. In other aspects, any other form, shape and/or arrangement of MIMO radar antenna 881 may be implemented.

In some demonstrative aspects, radar frontend 804 may include one or more radios configured to generate and transmit the Tx RF signals via Tx antennas 814; and/or to process the Rx RF signals received via Rx antennas 816, e.g., as described below.

In some demonstrative aspects, radar frontend 804 may include at least one transmitter (Tx) 883 including circuitry and/or logic configured to generate and/or transmit the Tx radar signals via Tx antennas 814.

In some demonstrative aspects, radar frontend 804 may include at least one receiver (Rx) 885 including circuitry and/or logic to receive and/or process the Rx radar signals received via Rx antennas 816, for example, based on the Tx radar signals.

In some demonstrative aspects, transmitter 883, and/or receiver 885 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, transmitter 883 may include a plurality of Tx chains 810 configured to generate and transmit the Tx RF signals via Tx antennas 814, e.g., respectively; and/or receiver 885 may include a plurality of Rx chains 812 configured to receive and process the Rx RF signals received via the Rx antennas 816, e.g., respectively.

In some demonstrative aspects, radar processor 834 may be configured to generate radar information 813, for example, based on the radar signals communicated by MIMO radar antenna 881, e.g., as described below. For example, radar processor 104 (FIG. 1), radar processor 210 (FIG. 1), radar processor 309 (FIG. 3), radar processor 402 (FIG. 4), and/or radar processor 503 (FIG. 5), may include one or more elements of radar processor 834, and/or may perform one or more operations and/or functionalities of radar processor 834.

In some demonstrative aspects, radar processor 834 may be configured to generate radar information 813, for example, based on Radar Rx data 811 received from the plurality of Rx chains 812. For example, radar Rx data 811 may be based on the Rx RF signals received via the Rx antennas 816.

In some demonstrative aspects, radar processor 834 may include an input 832 to receive the radar Rx data 811 from the plurality of Rx chains 812.

In some demonstrative aspects, radar processor 834 may include at least one processor 836, which may be configured, for example, to process the radar Rx data 811, and/or to perform one or more operations, methods, and/or algorithms.

In some demonstrative aspects, radar processor 834 may include at least one memory 838, e.g., coupled to the processor 836. For example, memory 838 may be configured to store data processed by radar processor 834. For example, memory 838 may store, e.g., at least temporarily, at least some of the information processed by the processor 836, and/or logic to be utilized by the processor 836.

In some demonstrative aspects, memory 838 may be configured to store at least part of the radar data, e.g., some of the radar Rx data 811 or all of the radar Rx data 811, for example, for processing by processor 836, e.g., as described below.

In some demonstrative aspects, memory 838 may be configured to store processed data, which may be generated by processor 836, for example, during the process of generating the radar information 813, e.g., as described below.

In some demonstrative aspects, memory 838 may be configured to store range information and/or Doppler information, which may be generated by processor 836, for example, based on the radar Rx data, e.g., as described below. In one example, the range information and/or Doppler information may be determined based on a Cross-Correlation (XCORR) operation, which may be applied to the radar RX data, e.g., as described below. Any other additional or alternative operation, algorithm and/or procedure may be utilized to generate the range information and/or Doppler information.

In some demonstrative aspects, memory 838 may be configured to store AoA information, which may be generated by processor 836, for example, based on the radar Rx data, the range information and/or Doppler information, e.g., as described below. In one example, the AoA information may be determined based on an AoA estimation algorithm, e.g., as described below. Any other additional or alternative operation, algorithm and/or procedure may be utilized to generate the AoA information.

In some demonstrative aspects, radar processor 834 may be configured to generate the radar information 813 including one or more of range information, Doppler information, and/or AoA information, e.g., as described below.

In some demonstrative aspects, the radar information 813 may include Point Cloud 1 (PC1) information, for example, including raw point cloud estimations, e.g., Range, Radial Velocity, Azimuth and/or Elevation.

In some demonstrative aspects, the radar information 813 may include Point Cloud 2 (PC2) information, which may be generated, for example, based on the PC1 information. For example, the PC2 information may include clustering information, tracking information, e.g., tracking of probabilities and/or density functions, bounding box information, classification information, orientation information, and the like.

In some demonstrative aspects, radar processor 834 may be configured to generate the radar information 813 in the form of four Dimensional (4D) image information, e.g., a cube, which may represent 4D information corresponding to one or more detected targets.

In some demonstrative aspects, the 4D image information may include, for example, range values, e.g., based on the range information, velocity values, e.g., based on the Doppler information, azimuth values, e.g., based on azimuth AoA information, elevation values, e.g., based on elevation AoA information, and/or any other values.

In some demonstrative aspects, radar processor 834 may be configured to generate the radar information 813 in any other form, and/or including any other additional or alternative information.

In some demonstrative aspects, radar processor 834 may be configured to process the signals communicated via MIMO radar antenna 881 as signals of a virtual MIMO array formed by a convolution of the plurality of Rx antennas 816 and the plurality of Tx antennas 814.

In some demonstrative aspects, radar frontend 804 and/or radar processor 834 may be configured to utilize MIMO techniques, for example, to support a reduced physical array aperture, e.g., an array size, and/or utilizing a reduced number of antenna elements. For example, radar frontend 804 and/or radar processor 834 may be configured to transmit orthogonal signals via a Tx array including a plurality of N elements, e.g., Tx antennas 814, and processing received signals via an Rx array including a plurality of M elements, e.g., Rx antennas 816.

In some demonstrative aspects, utilizing the MIMO technique of transmission of the orthogonal signals from the Tx array with N elements and processing the received signals in the Rx array with M elements may be equivalent, e.g., under a far field approximation, to a radar utilizing transmission from one antenna and reception with N*M antennas. For example, radar frontend 804 and/or radar processor 834 may be configured to utilize MIMO antenna array 881 as a virtual array having an equivalent array size of N*M, which may define locations of virtual elements, for example, as a convolution of locations of physical elements, e.g., the antennas 814 and/or 816.

In some demonstrative aspects, radar processor 834 may be configured to determine a plurality of potential targets based on the radar Rx data 811, e.g., as described below.

In some demonstrative aspects, radar processor 834 may be configured to determine a target detection map, for example, based on the radar Rx data 811. For example, radar processor 834 may be configured to determine a target detection map to include, for example, locations of the plurality of potential targets relative to the radar antenna 881.

In some demonstrative aspects, radar processor 834 may be configured to identify one or more true targets in the plurality of potential targets, e.g., as described below.

In some demonstrative aspects, radar processor 834 may be configured to identify the one or more true targets in a multipath scenario, e.g., as described below.

For example, a multipath scenario may include multipath signals from a plurality of paths between the radar antenna 881 and a target, e.g., as described below.

For example, in a multipath scenario there may be multiple paths in which radar signals may travel from a radar antenna to a true target and from the true target back to the radar antenna.

For example, in the multipath scenario, the radar antenna may receive a direct reflection from a true target via a direct path, for example, when a Tx angle, denoted $\theta^t$, in which a Tx radar signal is transmitted from the radar antenna, is equal to an Rx angle, denoted $\theta^r$, in which the radar antenna receives a reflection of the Tx radar signal from the true target, e.g., $\theta^t = \theta^r$. In such a case, a true range of the true target may be determined, e.g., based on the Tx radar signal and the Rx radar signal communicated via the direct path.

However, in the multipath scenario there may be one or more additional indirect paths, in which the radar signals may travel from the radar antenna to the true target and from the true target back to the radar antenna, for example, via one or more reflectors, e.g., one or more other targets.

For example, an indirect path may be characterized by a Tx angle which may be different from an Rx angle, e.g., $\theta^t \neq \theta^r$.

For example, an indirect reflection via an indirect path corresponding to a true target may be viewed as a ghost target, which may be located at a longer range than the true range of the true target.

In one example, a radar image of a true target in a multipath scenario may include a true target followed by a "trail" of one or more ghost targets, e.g., resulting from one or more respective indirect paths corresponding to the true target.

In some demonstrative aspects, there may be a need to address a technical problem for processing radar signals, e.g., in a multipath scenario. For example, the appearance of the ghost targets may result in an ambiguity, e.g., when attempting to identify whether a detected target is a true target or a ghost target of another true target.

In some demonstrative aspects, there may be one or more technical disadvantages, inefficiencies, and/or problems, for example, in some use cases, implementations and/or scenarios, for example, when using super-resolution algorithms, e.g., which looks on the Tx angle and Rx angle separately, for example, to address the ambiguity resulting from the multipath effect. For example, the super-resolution algorithms may have a very high computational complexity.

In one example, the ambiguity resulting from the multipath effect may be resolved, for example, by implementing a radar antenna ("a full uniform radar antenna") having a Tx antenna array and an Rx antenna array, where each of the Tx antenna array and the Rx antenna array, is implemented as a uniform antenna array with a uniform antenna spacing equal to half of a wavelength $\lambda/2$ of radar signals communicated by the radar antenna. For example, each of the Tx antenna array and the Rx antenna array may be implemented with a uniform antenna spacing of $\lambda/2$, wherein $\lambda$ denotes the wavelength of the radar signals communicated by the radar antenna. However, this full uniform radar antenna may not be practical and/or efficient, as it may result in very large antenna array.

Figure 9:
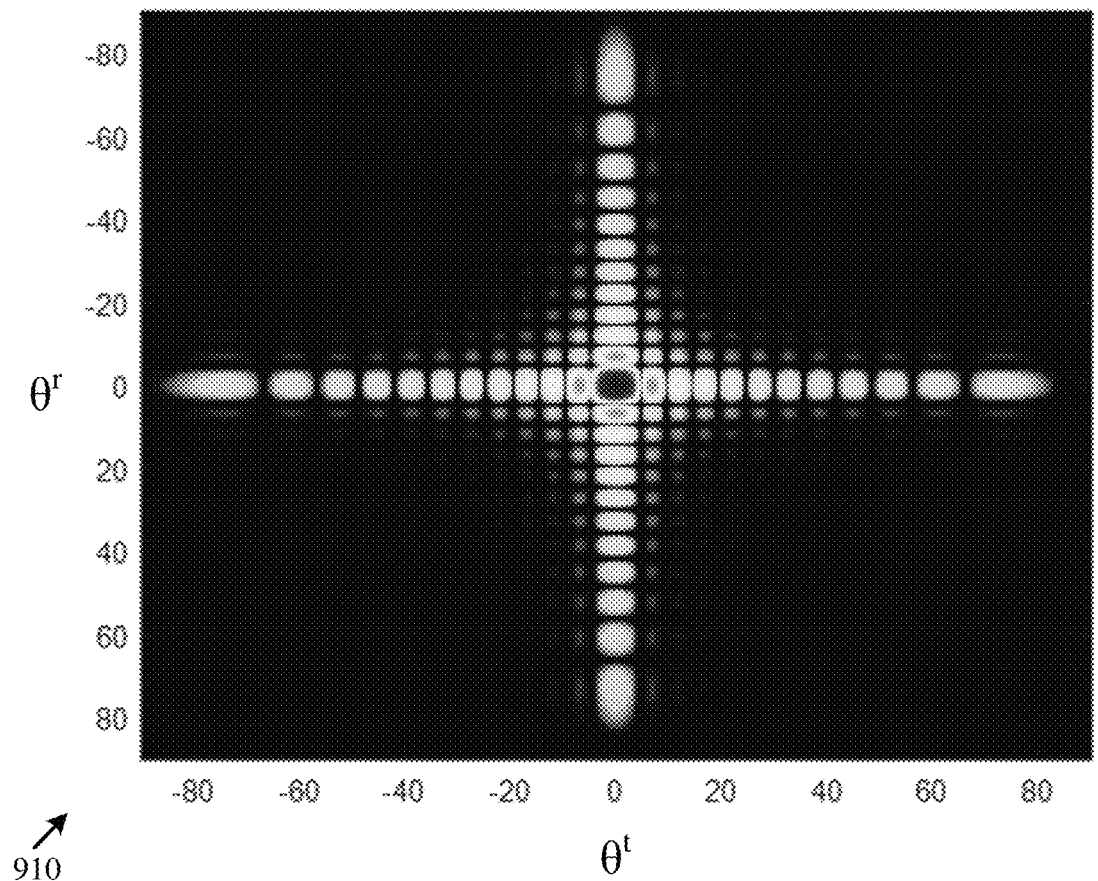
FIG. 9 is a schematic illustration of a graph depicting an array response of an antenna array to illustrate technical aspects, which may be addressed in accordance with some demonstrative aspects.

Reference is made to FIG. 9, which schematically illustrates a graph depicting an array response 910 of an antenna array to illustrate technical aspects, which may be addressed in accordance with some demonstrative aspects.

In one example, array response 910 may represent an array response of a full uniform radar antenna, e.g., in which each of the Tx antenna array and the Rx antenna array includes a uniform antenna array with a uniform spacing of $\lambda/2$.

In one example, the x axis of the graph of FIG. 9 may represent a Tx angle, and the y axis of the graph of FIG. 9 may represent an Rx angle.

In one example, array response 910 depicts an array response, for example, when coefficients (w) are tuned to a target at boresight, e.g., the Tx angle and the Rx angle are zero. For example, a dark shape at a location ($\theta^t$, $\theta r$) may represent a high array response to a signal transmitted towards a direction $\theta^t$ and received from a direction $\theta^r$, e.g., when the array is tuned to the boresight.

As shown in FIG. 9, array response 910 depicts an ideal response, in which only the angle of interest, e.g., (0,0), may have a high antenna response.

As shown in FIG. 9, array response 910 may not include high responses, e.g., resulting from the multipath effect, for example, other than the response at the angle of interest (0,0).

As shown in FIG. 9, there may be no ambiguity, e.g., in any of the Rx angle and the Tx angle, with respect to the detected target.

Referring back to FIG. 8, in some demonstrative aspects, radar antenna 881 may be configured according to an array structure ("one side full array"), in which one of the Tx antenna array 814 and the Rx antenna array 816 includes a uniform antenna array with a uniform spacing equal to half of a wavelength of the radar signals communicated by the radar antenna 881, e.g., as described below.

In some demonstrative aspects, one of the Tx antenna array 814 and the Rx antenna array 816 may include a uniform antenna array with a uniform spacing equal to half of a wavelength of the radar signals communicated by the radar antenna 881, while another one of the Tx antenna array 814 and the Rx antenna array 816 may not include the uniform antenna array with the uniform spacing, e.g., λ/2, equal to half of the wavelength, e.g., λ, of the radar signals communicated by the radar antenna 881, e.g., as described below.

For example, antenna array 881 may be configured such that Tx antenna array 814 includes a uniform antenna array with a uniform spacing of λ/2, while Rx antenna array 816 may not include the uniform antenna array with the uniform spacing of λ/2. In one example, Rx antenna array 816 may include a uniform antenna array with a uniform spacing different than λ/2. In another example, Rx antenna array 816 may include a non-uniform antenna array.

For example, antenna array 881 may be configured such that Rx antenna array 816 includes a uniform antenna array with a uniform spacing of λ/2, while Tx antenna array 814 may not include the uniform antenna array with the uniform spacing of λ/2. In one example, Tx antenna array 814 may include a uniform antenna array with a uniform spacing different than λ/2. In another example, Tx antenna array 814 may include a non-uniform antenna array.

In one example radar antenna 881 may be configured according to an array structure, in which one side of radar antenna 881, e.g., one of the Tx antenna array or the Rx antenna array, may be a fully uniform array with a uniform λ/2 antenna spacing, while an other side of radar antenna 881, e.g., another one of the Tx antenna array or the Rx antenna array, may be a sparse array. In one example, Rx antenna array 816 may be a fully uniform array with a uniform λ/2 antenna spacing, while Tx antenna array 814 may include two or more Tx antennas with an antenna spacing greater than λ/2.

In some demonstrative aspects, the one side full array with the uniform λ/2 antenna spacing may be implemented to address the ambiguity resulting from the multipath effect, for example, while maintaining a practical antenna size, e.g., compared to a size of the full uniform radar antenna.

Figure 10:
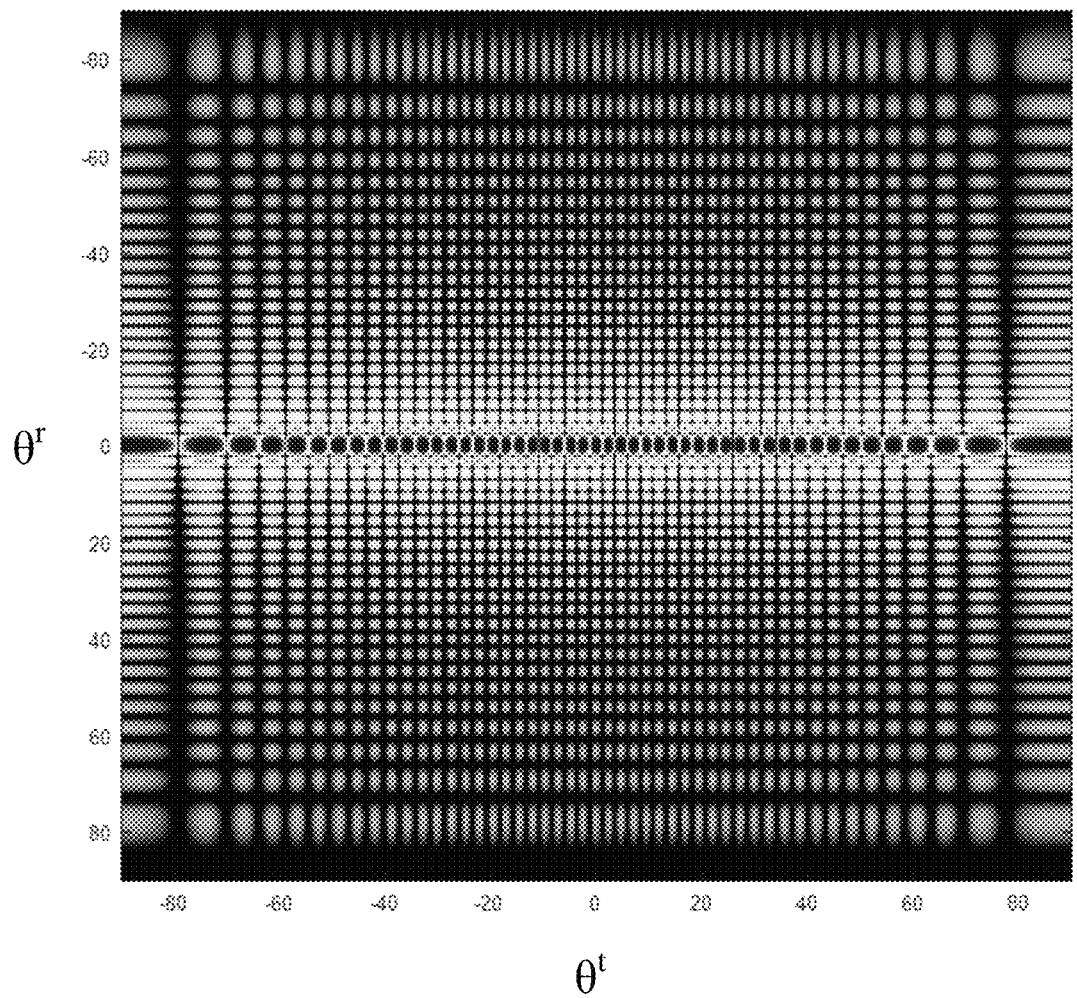
FIG. 10 is a schematic illustration of a graph depicting an array response of an antenna array, in accordance with some demonstrative aspects.

Reference is made to FIG. 10, which schematically illustrates a graph depicting an array response 1020 of an antenna array, in accordance with some demonstrative aspects.

In one example, array response 1020 may represent an array response of a one side full array, e.g., a radar antenna, in which the Rx antenna array includes a uniform antenna array with the uniform antenna spacing of λ/2, while the Tx array is not a uniform antenna array with the uniform antenna spacing of λ/2. For example, the Thx array may include two far apart antennas, e.g., with an antenna spacing of more than λ/2. In another example, more than two Tx antennas may be used.

In one example, the x axis of the graph of FIG. 10 represents a Tx angle, and the y axis of the graph of FIG. 10 represents an Rx angle.

In one example, array response 1020 depicts an array response, for example, when coefficients (w) are tuned to a target at boresight, e.g., the Tx angle and the Rx angle are zero. For example, a dark shape at a location ($\theta^t$, $\theta^r$) may represent a high array response to a signal that may be transmitted towards a direction $\theta^t$ and received from a direction $\theta^r$, e.g., when the array is tuned to the boresight.

As shown in FIG. 10, the array response 1020 may result in no ambiguity in the Rx angle, e.g., as a result of the uniform Rx antenna array with the uniform antenna spacing of λ/2. For example, as shown in FIG. 10, the array response 1020 shows a high response only for the Rx angle $\theta^r=0$.

As shown in FIG. 10, array response 1020 may have ambiguity in the Tx angle, e.g., as a result of the Tx antenna array, which may not be a uniform antenna array with the uniform antenna spacing of λ/2. For example, as shown in FIG. 10, the array response 1020 shows high responses at many Tx angles $\theta^t$. For example, this ambiguous antenna response in the Tx direction may make it difficult to determine information on the Tx angle.

As shown in FIG. 10, array response 1020 may allow detection of the true target, e.g., where $\theta^t=\theta^r$. However, other signals, which may be transmitted in other Tx directions may be reflected from other targets that interact with the true target and may still be received from the same direction $\theta^r=0$. These additional signals may cause ambiguity, e.g., in the form of ghost targets, which may appear to have a longer range than the true target.

For example, a true target may have a "trail" of ghost detections, which may result from indirect reflections. These ghost targets may appear on the same direction, e.g., the same angle, as the true target. However, in the range dimension, the ghost targets may have a range that is longer than a range of the true target.

Referring back to FIG. 8, in some demonstrative aspects, radar processor 834 may be configured to classify a plurality of potential targets as true targets or ghost targets, e.g., as described below.

In some demonstrative aspects, radar processor 834 may be configured to determine the plurality of potential targets based on radar signals communicated by radar antenna 881, which may be configured according to an antenna structure where one of the Tx antenna array 814 and the Rx antenna array 816 include a uniform antenna array with a uniform spacing equal to half of a wavelength of the radar signals, e.g., as described above. In other aspect, radar processor 834 may be configured to determine the plurality of potential targets based on radar signals communicated by radar antenna 881, which may be configured according to any other configuration.

In some demonstrative aspects, radar processor 834 may be configured to determine a target detection map, for example, based on the radar Rx data 811, e.g., as described below.

In some demonstrative aspects, the target detection map may include locations of the plurality of potential targets relative to the radar antenna 881, e.g., as described below.

In some demonstrative aspects, radar processor 834 may be configured to identify in the target detection map one or more locations that include true targets, e.g., as described below.

In some demonstrative aspects, radar processor 834 may be configured to classify the plurality of potential targets, for example, by calculating a probability, and/or identifying whether there may be a high probability, that a potential target is actually a multi-path artifact, e.g., as described below.

In some demonstrative aspects, radar processor 834 may be configured to classify the plurality of potential targets as true targets or ghost targets, for example, at a reduced computational complexity, e.g., compared to a computational complexity of super resolution algorithms.

In one example, classification of the plurality of potential targets as true or ghost targets may be implemented as an additional processing layer, for example, above one or more super-resolution algorithms. In another example, classification of the plurality of potential targets as true or ghost targets may be implemented instead of one or more operations or functionalities of one or more super resolution algorithms.

In some demonstrative aspects, radar processor 834 may be configured to identify one or more true targets in the plurality of potential targets, e.g., as described below.

In some demonstrative aspects, radar processor 834 may be configured to generate radar target information corresponding to the one or more true targets, e.g., as described below.

In some demonstrative aspects, radar processor 834 may be configured to identify a first potential target and a second potential target, which are at a same angle relative to the radar antenna 881, e.g., as described below.

In some demonstrative aspects, radar processor 834 may be configured to identify the first and second potential targets on a same azimuth angle relative to the radar antenna 881, e.g., as described below.

In some demonstrative aspects, radar processor 834 may be configured to identify the first and second potential targets on a same elevation angle relative to the radar antenna 881, e.g., as described below.

In some demonstrative aspects, radar processor 834 may be configured to classify the first potential target as a first true target, for example, based on a determination that a range between the first potential target and the radar antenna 881 is shorter than a range between the second potential target and the radar antenna 881, e.g., as described below.

In some demonstrative aspects, the range between the first potential target and the radar antenna 881 may be a shortest range of ranges of all potential targets on the same angle of the first potential target relative to the radar antenna 881, e.g., as described below.

In some demonstrative aspects, radar processor 834 may be configured to classify the second potential target as a second true target or as a ghost target of the first true target, for example, according to a classification criterion, e.g., as described below.

In some demonstrative aspects, the classification criterion may be based on the range between the second potential target and the radar antenna 881 and the range between the first potential target and the radar antenna 881, e.g., as described below. In other aspects, any other classification criterion may be used.

In some demonstrative aspects, the classification criterion may be based on detection of energy at one or more of a plurality of potential locations, e.g., as described below.

In some demonstrative aspects, the plurality of potential locations may include locations, which may be defined based on a location of the first potential target, a location of the second potential target, the range between the second potential target and the radar antenna 881, and/or the range between the first potential target and the radar antenna 881, e.g., as described below. In other aspects, any other additional or alternative potential locations may be defined.

In some demonstrative aspects, the plurality of potential locations may include locations, which nay represent potential reflector locations, which may cause appearance of the ghost target of the first true target at the location of the second potential target, e.g., as described below.

In some demonstrative aspects, the plurality of potential locations may be defined, for example, to include a potential location for which a sum of a first range, a second range, and the range between the first potential target and the radar antenna 881 may be equal to twice the range between the second potential target and the radar antenna 881, e.g., as described below.

In some demonstrative aspects, the first range may be a range between the potential location and the radar antenna 881, and the second range may be a range between the potential location and the location of the first potential target, e.g., as described below.

In some demonstrative aspects, radar processor 834 may be configured to classify the second potential target as the ghost target of the first true target, for example, based on a determination that an energy detection at a potential location of the plurality of potential locations is greater than a first predefined detection threshold, e.g., as described below.

In some demonstrative aspects, radar processor 834 may be configured to classify the second potential target as the second true target, for example, based on a determination that there is no energy detection, which is greater than a second predefined detection threshold, at the plurality of potential locations, e.g., as described below.

In one example, the second detection threshold may be equal to the first detection threshold. In other aspects, the second detection threshold may be different from the first detection threshold.

In some demonstrative aspects, radar processor 834 may be configured to classify one or more additional potential targets at the same angle as the first and second potential targets, e.g., as described below.

In some demonstrative aspects, radar processor 834 may be configured to identify a third potential target, which is at the same angle as the first and second potential targets relative to the radar antenna 881, e.g., as described below.

In some demonstrative aspects, a range between the third potential target and the radar antenna 881 may be longer than the range between the second potential target and the radar antenna, e.g., as described below.

In some demonstrative aspects, radar processor 834 may be configured to classify the third potential target as a third true target or as a ghost target of the second true target, e.g., as described below.

In some demonstrative aspects, radar processor 834 may be configured to classify the third potential target as the third true target or as the ghost target of the second true target, for example, based on a determination that the third potential target is not to be classified as another ghost target of the first potential target, e.g., as described below.

demonstrative aspects, radar processor 834 may be configured to classify the third potential target as the third true target or as the ghost target of the second true target, for example, based on a determination that the second potential target is to be classified as the second true target, e.g., as described below.

In some demonstrative aspects, radar processor 834 may be configured to identify a plurality of potential target groups corresponding to a respective plurality of angles relative to the radar antenna 881, e.g., as described below.

In some demonstrative aspects, radar processor 834 may be configured to iterate over the plurality of potential target groups, for example, to identify for a potential target group, e.g., for each potential target group, one or more true targets, e.g., as described below.

In some demonstrative aspects, radar processor 834 may be configured to repeat, e.g., with respect to the plurality of potential target groups, the operations of identifying the first and second potential targets, classifying the first potential target, and classifying the second potential target, e.g., as described below.

Figure 11:
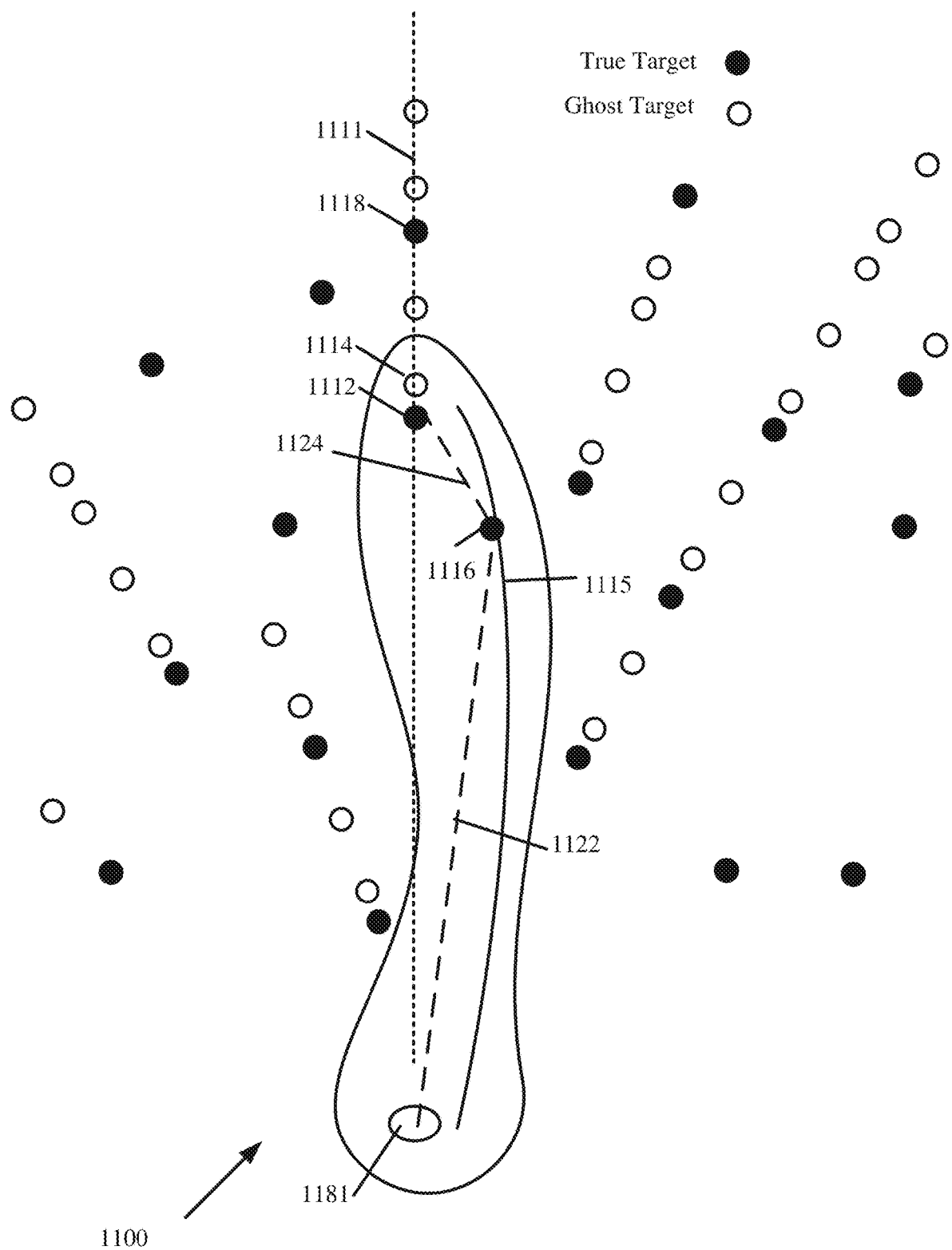
FIG. 11 is a schematic illustration of a target detection map, in accordance with some demonstrative aspects.

Reference is made to FIG. 11, which schematically illustrates a target detection map 1100, in accordance with some demonstrative aspects.

In one example, target detection map 1100 may include locations of a plurality of potential targets relative to a radar antenna 1181, e.g., radar antenna 881 (FIG. 8).

In some demonstrative aspects, radar processor 834 (FIG. 8) may be configured to determine the target detection map 1100, for example, based on the radar Rx data 811 (FIG. 1).

In some demonstrative aspects, radar processor 834 (FIG. 8) may be configured to identify in the target detection map 1100 one or more locations of true targets, e.g., as described below.

In some demonstrative aspects, radar processor 834 (FIG. 8) may identify a first potential target 1112 and a second potential target 1114, which are at a same angle 1111, e.g., a zero angle, relative to the radar antenna 1181.

In some demonstrative aspects, radar processor 834 (FIG. 8) may be configured to classify the first potential target 1112 as a first true target, for example, based on a determination that a range between the first potential target 1112 and the radar antenna 1181 is shorter than a range between the second potential target 1114 and the radar antenna 1181.

In some demonstrative aspects, as shown in FIG. 11, the range between the first potential target 1112 and the radar antenna 1181 may be the shortest range of ranges of all potential targets on angle 1111.

In some demonstrative aspects, radar processor 834 (FIG. 8) may be configured to classify the second potential target 1114 as a second true target or as a ghost target of the first true target 1112, for example, according to a classification criterion, which is based on the range between the second potential target 1114 and the radar antenna 1181, and the range between the first potential target 1112 and the radar antenna 1181, e.g., as described below.

In some demonstrative aspects, the classification criterion may be based on detection of energy at one or more of a plurality of potential locations 1115, e.g., as described below.

In some demonstrative aspects, the plurality of potential locations 1115 may be defined based on a location of the first potential target 1112, a location of the second potential target 1114, the range between the second potential target 1114 and the radar antenna 1181, and the range between the first potential target 1112 and the radar antenna 1181, e.g., as described below.

In some demonstrative aspects, the plurality of potential locations 1115 may represent potential reflector locations, which may cause appearance of a ghost target of the first true target 1112 at the location of the second potential target 1114, e.g., as described below.

In some demonstrative aspects, the plurality of potential locations 1115 may be defined to include a potential location 1116 for which a sum of a first range 1122, a second range 1124, and the range between the first potential target 1112 and the radar antenna 1181, may be equal to twice the range between the second potential 1114 target and the radar antenna 1181.

In some demonstrative aspects, as shown in FIG. 11, the first range 1122 may be the range between the potential location 1116 and the radar antenna 1181, and the second range 1124 may be the range between the potential location 1116 and the location of the first potential target 1112.

In some demonstrative aspects, radar processor 834 (FIG. 8) may classify the second potential target 1114 as the ghost target of the first true target, for example, if an energy detection at one or more of the plurality of potential locations 1115, e.g., an energy detection at the potential location 1116, is greater than a predefined detection threshold.

In some demonstrative aspects, radar processor 834 (FIG. 8) may classify the second potential target 1114 as a second true target, for example, if there is no energy detection, which is greater than a predefined detection threshold, at any of the plurality of potential locations 1115.

In one example, the plurality of potential locations 1115 may include a curve of potential locations, which may satisfy the following equation:

$$\text{sqrt}(x^2+y^2)+\text{sqrt}((x-xt)^2+(y-yt)^2)+rt=2*rg$$

wherein (x,y) denotes a geometrical location of potential targets, e.g., potential target location 1116, that can interact with the true target 1112 to generate a ghost target, e.g., at the same location of the potential target 1114; (xt,yt) denotes the coordinates of the true target 1112; rt denotes the range between the first potential target 1112 and the radar antenna 1181; and rg denotes the range between the second potential target 1114 and the radar antenna 1181.

According to this example, the term sqrt $(x^2+y^2)$ may represent the range 1122, and the term sqrt $((x-xt)^2+(y-yt)^2)$ may represent the range 1124, e.g., with respect to the potential location 1116.

In one example, a similar processing, e.g., including a curve of potential locations, may be applied for Doppler values. However, since there may be tangential velocities, which may not be measured, some characteristics on the targets may be assumed, for example, to determine the curve of potential locations in a simplified manner. For example, it may be assumed that there is no tangential velocity on the potential targets.

Figure 12:
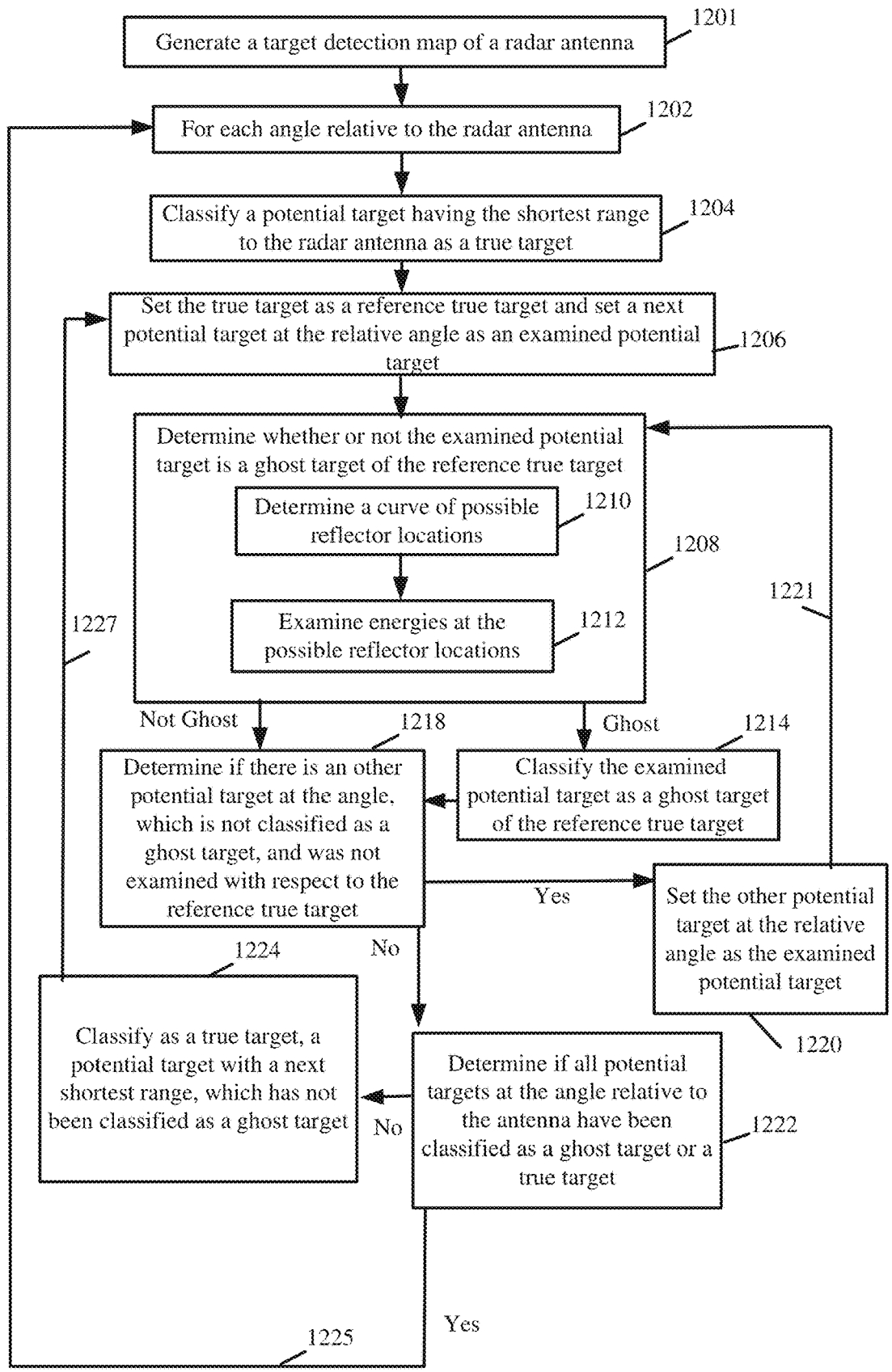
FIG. 12 is a schematic-flow chart illustration of a method of processing a plurality of potential targets to identify one or more true targets, in accordance with some demonstrative aspects.

Reference is made to FIG. 12, which schematically illustrates a method of processing a plurality of potential targets to identify one or more true targets, in accordance with some demonstrative aspects. For example, one or more of the operations of the method of FIG. 12 may be performed by a processor, e.g., radar processor 834 (FIG. 8).

In some demonstrative aspects, as indicated at block 1201, the method may include generating a target detection map of radar signals communicated by a radar antenna. For example, radar processor 834 (FIG. 8) may generate the target detection map based on radar signals communicated by radar antenna 881 (FIG. 8), e.g., as described above.

In some demonstrative aspects, as indicated at block 1202, the method may include iterating over a plurality of angles relative to the radar antenna, e.g., as described below.

For example, the method may include performing for a relative angle one or more operations to identify one or more true targets at the relative angle, e.g., as described below.

In some demonstrative aspects, as indicated at block 1204, the method may include classifying as a true target a potential target, which has the shortest range to the radar antenna at the relative angle. For example, radar processor 834 (FIG. 8) may classify as a true target the potential target 1112 (FIG. 10) having the shortest range to the radar antenna 1181 (FIG. 11) at the angle 1111 (FIG. 11), e.g., as described above.

In some demonstrative aspects, as indicated at block 1206, the method may include setting the true target as a reference true target, and setting a next potential target at the relative angle as an examined potential target. For example, radar processor 834 (FIG. 8) may set the potential target 1112 (FIG. 11) as the reference true target, and the potential target 1114 (FIG. 11) as the examined potential target, e.g., as described above.

In some demonstrative aspects, as indicated at block 1208, the method may include determining whether or not the examined potential targets a ghost target of the reference true target. For example, radar processor 834 (FIG. 8) may determine whether or not potential target 1114 (FIG. 11) is a ghost target of the true target 1112 (FIG. 11), e.g., as described above.

In some demonstrative aspects, as indicated at block 1210, determining whether or not the examined potential target is a ghost target of the reference true target may include determining a curve of potential reflector locations corresponding to the reference true target and the examined potential target. For example, radar processor 834 (FIG. 8) may determine the curve of the plurality of potential locations 1115 (FIG. 11), e.g., as described above.

In some demonstrative aspects, as indicated at block 1212, determining whether or not the examined potential target is a ghost target of the reference true target may include examining energies at the potential reflector locations. For example, radar processor 834 (FIG. 8) may determine whether or not potential target 1114 (FIG. 11) is a ghost target of the true target 1112 (FIG. 11) by examining energies at the potential locations 1115 (FIG. 11), e.g., as described above.

In some demonstrative aspects, as indicated at block 1214, the method may include classifying the examined potential target as a ghost target of the reference true target, for example, based on a determination that the examined potential target is a ghost target of the reference true target. For example, radar processor 834 (FIG. 8) may classify the potential target 1114 (FIG. 11) as a ghost target of the true target 1112 (FIG. 11), for example, based on a determination that an energy detection at a potential location of the plurality of potential locations 1115 (FIG. 11) is greater than a predefined detection threshold, e.g., as described above.

In some demonstrative aspects, as indicated at block 1218, the method may include determining if there is an other potential target at the relative angle, which is not classified as a ghost target, and was not examined with respect to the reference true target. For example, radar processor 834 (FIG. 8) may determine if there is an other potential target at the angle 1111 (FIG. 11), which is not classified as a ghost target, and was not examined with respect to the reference true target 1112 (FIG. 11).

In some demonstrative aspects, as indicated at block 1220, the method may include setting the other potential target at the relative angle as the examined potential target. For example, radar processor 834 (FIG. 8) may set as the examined potential target another potential target at the relative angle 1111 (FIG. 11), which is not classified as a ghost target, and was not examined with respect to the reference true target true target 1112 (FIG. 11).

As indicated by arrow 1221, the method may include repeating the operation of block 1208 with respect to the examined potential target set at block 1220.

In some demonstrative aspects, as indicated at block 1222, the method may include determining if all potential targets at the angle relative to the antenna have been classified as a ghost target or a true target. For example, radar processor 834 (FIG. 8) may determine if all potential targets at the angle 1111 (FIG. 11) have been classified as a ghost target or a true target.

In some demonstrative aspects, as indicated at block 1224, the method may include classifying as a true target, a potential target with a next shortest range, which has not been classified as a ghost target. For example, radar processor 834 (FIG. 8) may classify as a true target, a potential target 1118 (FIG. 11), e.g., with a next shortest range, which has not been classified as a ghost target.

In some demonstrative aspects, as indicated by arrow 1227, the method may include repeating the operations of the method from block 1206, for example, with respect to the potential target with the next shortest range. For example, radar processor 834 (FIG. 8) may repeat the operations of block 1206, for example, with respect to the potential target 1118 (FIG. 11) set as the reference true target.

In some demonstrative aspects, as indicated by arrow 1225, the method may include repeating the operations from block 1202, for example, with respect to another relative angle, for example, when all the potential targets at the angle relative to the antenna have been classified as a ghost target or a true target. For example, radar processor 834 (FIG. 8) may iterate over a plurality of relative angles by repeating the operations from block 1202.

In some demonstrative aspects, radar processor 834 (FIG. 1) may be configured to perform the method of FIG. 12 recursively. For example, a potential target which was classified as a true target in a previous round may be checked against all potential targets with larger range, for example, to determine, e.g., with high probability, whether any of these potential targets is a ghost target of the true target. For example, the potential target having the shortest range to the radar antenna at an angle relative to the radar antenna may be always considered as a reference true target.

In some demonstrative aspects, radar processor 834 (FIG. 8) may generate a target detection map corresponding to a virtual array of radar antenna 881 (FIG. 8) virtual array, for example, while ignoring a multi-path effect, for example, as described above with reference to block 1201.

In some demonstrative aspects, radar processor 834 (FIG. 8) may choosing for an angle, e.g., for each azimuth/elevation angle, a potential target with the shortest range to the radar antenna 1181 (FIG. 11), and may declare this potential target as a true target, for example, as described above with reference to block 1204.

In some demonstrative aspects, radar processor 834 (FIG. 8) may check whether other potential targets with larger range to the radar antenna 1181 (FIG. 11) have a high probability to be multi-path targets, e.g., ghost targets. For example, radar processor 834 (FIG. 8) may calculate, for an examined potential target, a curve including all possible locations that can generate a ghost target of the reference true target at the location of the examined potential target, e.g., as described above with reference to block 1208.

For example, radar processor 834 (FIG. 8) may determine that the examined potential target may have a high probability to be a ghost of the reference target, for example, if there are one or more strong enough detections on the curve of all possible locations, e.g., as described above.

In some demonstrative aspects, radar processor 834 (FIG. 8) may set the reference true target to include the next potential target with a larger range than the previous one, which was not declared as a ghost, and may repeat the operation of check whether other potential targets with larger range to the radar antenna 1181 (FIG. 11) have a high probability to be multi-path targets, e.g., with respect to the new reference true target.

In some demonstrative aspects, radar processor 834 (FIG. 8) may iterate over other angels, e.g., over each other azimuth and/or elevation angle, for example, by repeating the operations for classifying the potential targets as true targets or ghost targets, e.g., as described above with reference to blocks 1202-1222.

Figure 13:
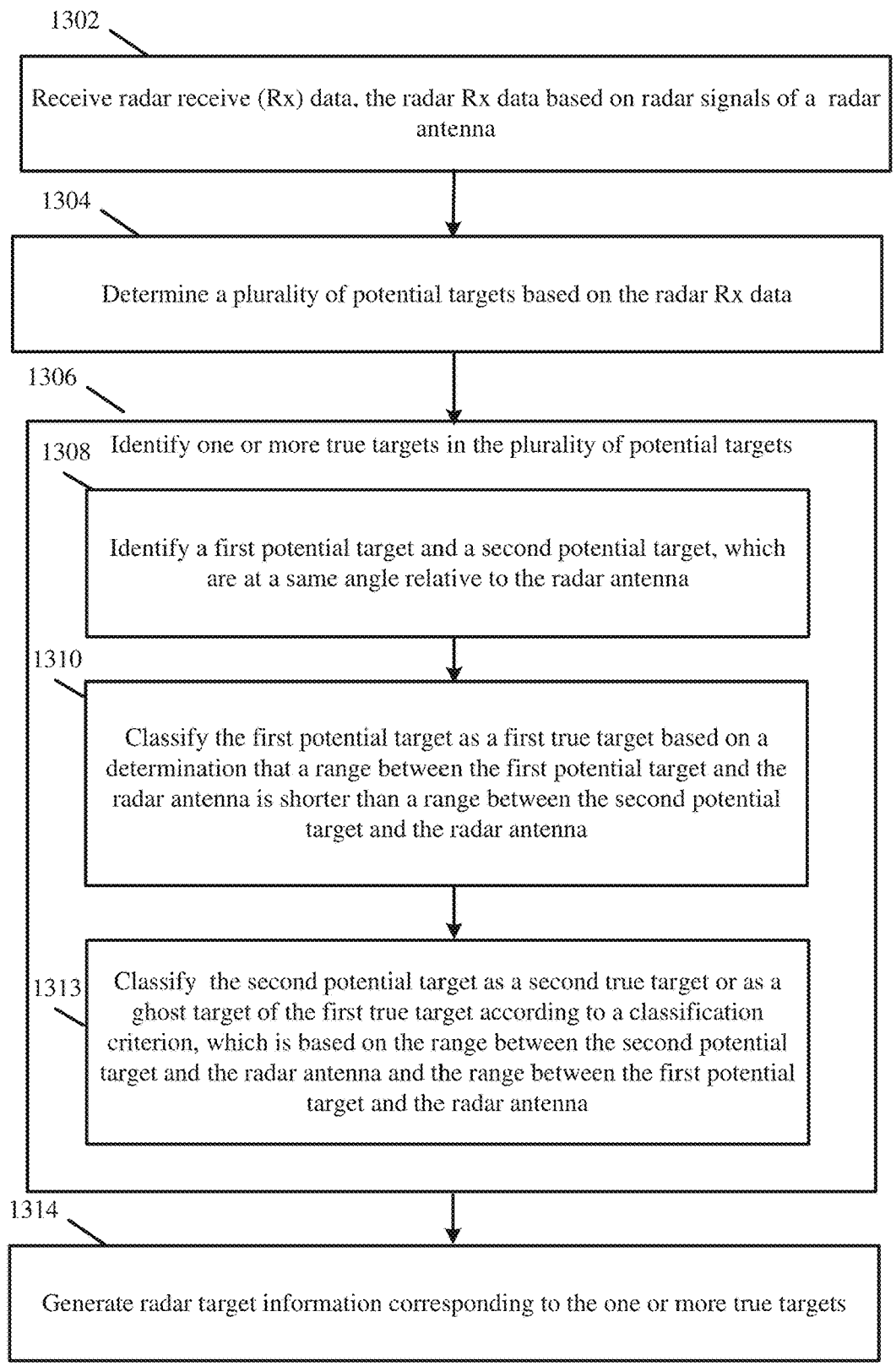
FIG. 13 is a schematic-flow chart illustration of a method of generating radar target information, in accordance with some demonstrative aspects.

Reference is made to FIG. 13, which schematically illustrates a method of generating radar target information, in accordance with some demonstrative aspects. For example, one or more of the operations of the method of FIG. 13 may be performed by a radar processor, e.g., radar processor 834 (FIG. 8).

As indicated at block 1302, the method may include receiving radar Rx data, the radar Rx data based on radar signals of a radar antenna. For example, radar processor 834 (FIG. 8) may receive, e.g., via input 832 (FIG. 8), the radar Rx data 811 (FIG. 8), which is based on the radar signals communicated by radar antenna 881 (FIG. 8), e.g., as described above.

As indicated at block 1304, the method may include determining a plurality of potential targets based on the radar Rx data. For example, radar processor 834 (FIG. 8) may determine the plurality of potential targets, e.g., in the form of detection map 1100 (FIG. 11), based on the radar Rx data 811 (FIG. 8), e.g., as described above.

As indicated at block 1306, the method may include identifying one or more true targets in the plurality of potential targets. For example, radar processor 834 (FIG. 8) may identify the one or more true targets in the plurality of potential targets, e.g., as described above.

As indicated at block 1308, identifying the one or more true targets may include identifying a first potential target and a second potential target, which are at a same angle relative to the radar antenna. For example, radar processor 834 (FIG. 8) may identify the first potential target and the second potential target, which are at the same angle relative to the radar antenna 881 (FIG. 8), e.g., as described above.

As indicated at block 1310, identifying the one or more true targets may include classifying the first potential target as a first true target based on a determination that a range between the first potential target and the radar antenna is shorter than a range between the second potential target and the radar antenna. For example, radar processor 834 (FIG. 8) may classify the first potential target as the first true target based on the determination that the range between the first potential target and the radar antenna 881 (FIG. 8) is shorter than the range between the second potential target and the radar antenna 881 (FIG. 8), e.g., as described above.

As indicated at block 1312, identifying the one or more true targets may include classifying the second potential target as a second true target or as a ghost target of the first true target according to a classification criterion, which is based on the range between the second potential target and the radar antenna and the range between the first potential target and the radar antenna. For example, radar processor 834 (FIG. 8) may classify the second potential target as the second true target or as the ghost target of the first true target according to the classification criterion, e.g., as described above.

As indicated at block 1314, the method may include generating radar target information corresponding to the one or more true targets. For example, radar processor 834 (FIG. 8) may generate the radar target information corresponding to the one or more true targets, e.g., as described above.

Figure 14:
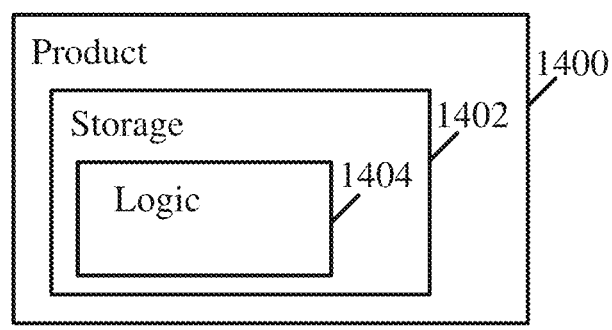
FIG. 14 is a schematic illustration of a product of manufacture, in accordance with some demonstrative aspects.

Reference is made to FIG. 14, which schematically illustrates a product of manufacture 1400, in accordance with some demonstrative aspects. Product 1400 may include one or more tangible computer-readable ("machine-readable") non-transitory storage media 1402, which may include computer-executable instructions, e.g., implemented by logic 1404, operable to, when executed by at least one computer processor, enable the at least one computer processor to implement one or more operations and/or functionalities of radar processor 834 (FIG. 8), one or more operations and/or functionalities described with reference to the FIGS. 1-13, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 1400 and/or storage media 1402 may include one or more types of computer-readable storage media capable of storing data, including volatile memory, non-volatile memory, removable or non-removable memory, erasable or non-erasable memory, writeable or re-writeable memory, and the like. For example, storage media 1402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 1404 may include instructions, data, and/or code, which, if executed by a machine, may cause the machine to perform a method, process, and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 1404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner, or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further aspects.

Example 1 includes an apparatus comprising an input to receive radar receive (Rx) data, the radar Rx data based on radar signals of a radar antenna; and a processor configured to determine a plurality of potential targets based on the radar Rx data; to identify one or more true targets in the plurality of potential targets by identifying a first potential target and a second potential target, which are at a same angle relative to the radar antenna; classifying the first potential target as a first true target based on a determination that a range between the first potential target and the radar antenna is shorter than a range between the second potential target and the radar antenna; and classifying the second potential target as a second true target or as a ghost target of the first true target according to a classification criterion, which is based on the range between the second potential target and the radar antenna and the range between the first potential target and the radar antenna; and to generate radar target information corresponding to the one or more true targets.

Example 2 includes the subject matter of Example 1, and optionally, wherein the classification criterion is based on detection of energy at one or more of a plurality of potential locations, which are defined based on a location of the first potential target, a location of the second potential target, the range between the second potential target and the radar antenna, and the range between the first potential target and the radar antenna.

Example 3 includes the subject matter of Example 2, and optionally, wherein the plurality of potential locations represents potential reflector locations to cause appearance of the ghost target of the first true target at the location of the second potential target.

Example 4 includes the subject matter of Example 2 or 3, and optionally, wherein the plurality of potential locations is defined to include a potential location for which a sum of a first range, a second range, and the range between the first potential target and the radar antenna is equal to twice the range between the second potential target and the radar antenna, wherein the first range is a range between the potential location and the radar antenna, and the second range is a range between the potential location and the location of the first potential target.

Example 5 includes the subject matter of any one of Examples 2-4, and optionally, wherein the processor is configured to classify the second potential target as the ghost target of the first true target based on a determination that an energy detection at a potential location of the plurality of potential locations is greater than a predefined detection threshold.

Example 6 includes the subject matter of any one of Examples 2-5, and optionally, wherein the processor is configured to classify the second potential target as the second true target based on a determination that there is no energy detection, which is greater than a predefined detection threshold, at the plurality of potential locations.

Example 7 includes the subject matter of any one of Examples 1-6, and optionally, wherein the processor is configured to:

identify a third potential target, which is at the same angle as the first and second potential targets relative to the radar antenna, a range between the third potential target and the radar antenna is longer than the range between the second potential target and the radar antenna; and based on a determination that the third potential target is not to be classified as another ghost target of the first potential target and a determination that the second potential target is to be classified as the second true target, classify the third potential target as a third true target or as a ghost target of the second true target.

Example 8 includes the subject matter of any one of Examples 1-7, and optionally, wherein the range between the first potential target and the radar antenna is a shortest range of ranges of all potential targets on the same angle of the first potential target relative to the radar antenna.

Example 9 includes the subject matter of any one of Examples 1-8, and optionally, wherein the processor is configured to identify a plurality of potential target groups corresponding to a respective plurality of angles relative to the radar antenna, and to repeat, with respect to the plurality of potential target groups, identifying the first and second potential targets, classifying the first potential target, and classifying the second potential target.

Example 10 includes the subject matter of any one of Examples 1-9, and optionally, wherein the processor is configured to determine a target detection map based on the radar Rx data, the target detection map comprising locations of the plurality of potential targets relative to the radar antenna.

Example 11 includes the subject matter of any one of Examples 1-10, and optionally, wherein the processor is configured to identify the first and second potential targets on a same azimuth angle relative to the radar antenna.

Example 12 includes the subject matter of any one of Examples 1-11, and optionally, wherein the processor is configured to identify the first and second potential targets on a same elevation angle relative to the radar antenna.

Example 13 includes the subject matter of any one of Examples 1-12, and optionally, wherein the radar antenna comprises a Transmit (Tx) antenna array and an Rx antenna array, wherein one of the Tx antenna array and the Rx antenna array comprises a uniform antenna array with a uniform spacing equal to half of a wavelength of the radar signals.

Example 14 includes the subject matter of any one of Examples 1-13, and optionally, wherein the radar antenna comprises a Multiple-Input-Multiple-Output (MIMO) radar antenna.

Example 15 includes the subject matter of any one of Examples 1-14, and optionally, comprising the radar antenna comprising a plurality of Rx antennas and a plurality of Transmit (Tx) antennas.

Example 16 includes the subject matter of Example 15, and optionally, comprising a vehicle, the vehicle comprising a system controller to control one or more systems of the vehicle based on the radar target information.

Example 17 includes an apparatus comprising means for executing any of the described operations of Examples 1-16.

Example 18 includes a machine-readable medium that stores instructions for execution by a processor to perform any of the described operations of Examples 1-16.

Example 19 includes an apparatus comprising a memory; and processing circuitry configured to perform any of the described operations of Examples 1-16.

Example 20 includes a method including any of the described operations of Examples 1-16.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
an input to receive radar receive (Rx) data, the radar Rx data based on radar signals of a radar antenna; and a processor configured to:
  determine a plurality of potential targets based on the radar Rx data;
  identify one or more true targets in the plurality of potential targets by:
    identifying a first potential target and a second potential target, which are at a same angle relative to the radar antenna;
    classifying the first potential target as a first true target based on a determination that a range between the first potential target and the radar antenna is shorter than a range between the second potential target and the radar antenna; and
    classifying the second potential target as a second true target or as a ghost target of the first true target according to a classification criterion, which is based on the range between the second potential target and the radar antenna and the range between the first potential target and the radar antenna; and
  generate radar target information corresponding to the one or more true targets.

2. The apparatus of claim 1, wherein the classification criterion is based on detection of energy at one or more of a plurality of potential locations, wherein the plurality of potential locations is defined based on a location of the first potential target, a location of the second potential target, the range between the second potential target and the radar antenna, and the range between the first potential target and the radar antenna.

3. The apparatus of claim 2, wherein the plurality of potential locations represents potential reflector locations to cause appearance of the ghost target of the first true target at the location of the second potential target.

4. The apparatus of claim 2, wherein the plurality of potential locations is defined to include a potential location for which a sum of a first range, a second range, and the range between the first potential target and the radar antenna is equal to twice the range between the second potential target and the radar antenna, wherein the first range is a range between the potential location and the radar antenna, and the second range is a range between the potential location and the location of the first potential target.

5. The apparatus of claim 2, wherein the processor is configured to classify the second potential target as the ghost target of the first true target based on a determination that an energy detection at a potential location of the plurality of potential locations is greater than a predefined detection threshold.

6. The apparatus of claim 2, wherein the processor is configured to classify the second potential target as the second true target based on a determination that there is no energy detection, which is greater than a predefined detection threshold, at the plurality of potential locations.

7. The apparatus of claim 1, wherein the processor is configured to:
  identify a third potential target, which is at the same angle as the first and second potential targets relative to the radar antenna, wherein a range between the third potential target and the radar antenna is longer than the range between the second potential target and the radar antenna; and
  based on a determination that the third potential target is not to be classified as another ghost target of the first potential target and a determination that the second potential target is to be classified as the second true target, classify the third potential target as a third true target or as a ghost target of the second true target.

8. The apparatus of claim 1, wherein the range between the first potential target and the radar antenna is a shortest range of ranges of all potential targets on the same angle of the first potential target relative to the radar antenna.

9. The apparatus of claim 1, wherein the processor is configured to identify a plurality of potential target groups corresponding to a respective plurality of angles relative to the radar antenna, and to repeat, with respect to the plurality of potential target groups, identifying the first and second potential targets, classifying the first potential target, and classifying the second potential target.

10. The apparatus of claim 1, wherein the processor is configured to determine a target detection map based on the radar Rx data, the target detection map comprising locations of the plurality of potential targets relative to the radar antenna.

11. The apparatus of claim 1, wherein the processor is configured to identify the first and second potential targets on a same azimuth angle relative to the radar antenna.

12. The apparatus of claim 1, wherein the processor is configured to identify the first and second potential targets on a same elevation angle relative to the radar antenna.

13. The apparatus of claim 1, wherein the radar antenna comprises a Transmit (Tx) antenna array and an Rx antenna array, wherein one of the Tx antenna array and the Rx antenna array comprises a uniform antenna array with a uniform spacing equal to half of a wavelength of the radar signals.

14. The apparatus of claim 1, wherein the radar antenna comprises a Multiple-Input-Multiple-Output (MIMO) radar antenna.

15. The apparatus of claim 1 comprising the radar antenna comprising a plurality of Rx antennas and a plurality of Transmit (Tx) antennas.

16. A product comprising one or more tangible computer-readable non-transitory storage media comprising computer-executable instructions operable to, when executed by at least one processor, enable the at least one processor to cause a radar device to:
  determine a plurality of potential targets based on radar receive (Rx) data, the radar Rx data based on radar signals of a radar antenna;
  identify one or more true targets in the plurality of potential targets by:
    identifying a first potential target and a second potential target, which are at a same angle relative to the radar antenna;
    classifying the first potential target as a first true target based on a determination that a range between the first potential target and the radar antenna is shorter than a range between the second potential target and the radar antenna; and
    classifying the second potential target as a second true target or as a ghost target of the first true target according to a classification criterion, which is based on the range between the second potential target and the radar antenna and the range between the first potential target and the radar antenna; and
  generate radar target information corresponding to the one or more true targets.

17. The product of claim 16, wherein the classification criterion is based on detection of energy at one or more of a plurality of potential locations, wherein the plurality of potential locations is defined based on a location of the first potential target, a location of the second potential target, the range between the second potential target and the radar antenna, and the range between the first potential target and the radar antenna.

18. The product of claim 17, wherein the plurality of potential locations is defined to include a potential location for which a sum of a first range, a second range, and the range between the first potential target and the radar antenna is equal to twice the range between the second potential target and the radar antenna, wherein the first range is a range between the potential location and the radar antenna, and the second range is a range between the potential location and the location of the first potential target.

19. The product of claim 17, wherein the instructions, when executed, cause the radar device to classify the second potential target as the ghost target of the first true target based on a determination that an energy detection at a potential location of the plurality of potential locations is greater than a predefined detection threshold.

20. The product of claim 17, wherein the instructions, when executed, cause the radar device to classify the second potential target as the second true target based on a determination that there is no energy detection, which is greater than a predefined detection threshold, at the plurality of potential locations.

21. The product of claim 16, wherein the instructions, when executed, cause the radar device to:
identify a third potential target, which is at the same angle as the first and second potential targets relative to the radar antenna, wherein a range between the third potential target and the radar antenna is longer than the range between the second potential target and the radar antenna; and
based on a determination that the third potential target is not to be classified as another ghost target of the first potential target and a determination that the second potential target is to be classified as the second true target, classify the third potential target as a third true target or as a ghost target of the second true target.

22. The product of claim 16, wherein the instructions, when executed, cause the radar device to identify a plurality of potential target groups corresponding to a respective plurality of angles relative to the radar antenna, and to repeat, with respect to the plurality of potential target groups, identifying the first and second potential targets, classifying the first potential target, and classifying the second potential target.

23. A vehicle comprising:
a system controller configured to control one or more vehicular systems of the vehicle based on radar information; and
a radar device configured to generate the radar information, the radar device comprising:
a radar antenna comprising a plurality of Transmit (Tx) antennas to transmit Tx radar signals, and a plurality of Receive (Rx) antennas to receive Rx radar signals based on the Tx radar signals; and
a processor configured to generate the radar information based on radar Rx data, the radar Rx data based on the Rx radar signals, the processor configured to:
determine a plurality of potential targets based on the radar Rx data;
identify one or more true targets in the plurality of potential targets by:
identifying a first potential target and a second potential target, which are at a same angle relative to the radar antenna;
classifying the first potential target as a first true target based on a determination that a range between the first potential target and the radar antenna is shorter than a range between the second potential target and the radar antenna; and
classifying the second potential target as a second true target or as a ghost target of the first true target according to a classification criterion, which is based on the range between the second potential target and the radar antenna and the range between the first potential target and the radar antenna; and
generate the radar information comprising radar target information corresponding to the one or more true targets.

24. The vehicle of claim 23, wherein the classification criterion is based on detection of energy at one or more of a plurality of potential locations, wherein the plurality of potential locations is defined based on a location of the first potential target, a location of the second potential target, the range between the second potential target and the radar antenna, and the range between the first potential target and the radar antenna.

25. The vehicle of claim 23, wherein the processor is configured to identify a plurality of potential target groups corresponding to a respective plurality of angles relative to the radar antenna, and to repeat, with respect to the plurality of potential target groups, identifying the first and second potential targets, classifying the first potential target, and classifying the second potential target.

* * * * *